United States Patent
Esswein et al.

(10) Patent No.: US 9,899,694 B2
(45) Date of Patent: *Feb. 20, 2018

(54) ELECTROCHEMICAL ENERGY STORAGE SYSTEMS AND METHODS FEATURING HIGH OPEN CIRCUIT POTENTIAL

(71) Applicant: Lockheed Martin Advanced Energy Storage, LLC, Bethesda, MD (US)

(72) Inventors: Arthur J. Esswein, Somerville, MA (US); Steven Y. Reece, Cambridge, MA (US); John Goeltz, Cambridge, MA (US); Evan R. King, Quincy, MA (US); Desiree Amadeo, Belmont, MA (US); Nitin Tyagi, Cambridge, MA (US); Thomas D. Jarvi, Manchester, CT (US)

(73) Assignee: Lockheed Martin Advanced Energy Storage, LLC, Bethesda, MD (US)

( * ) Notice: Subject to any disclaimer, the term of this patent is extended or adjusted under 35 U.S.C. 154(b) by 797 days.

This patent is subject to a terminal disclaimer.

(21) Appl. No.: 13/949,373

(22) Filed: Jul. 24, 2013

(65) Prior Publication Data

US 2014/0080035 A1    Mar. 20, 2014

Related U.S. Application Data

(63) Continuation-in-part of application No. 13/948,497, filed on Jul. 23, 2013, which is a continuation-in-part
(Continued)

(51) Int. Cl.
*H01M 4/36* (2006.01)
*H01M 8/18* (2006.01)
*H01M 8/20* (2006.01)

(52) U.S. Cl.
CPC ............ *H01M 8/188* (2013.01); *H01M 8/20* (2013.01); *Y02E 60/528* (2013.01)

(58) Field of Classification Search
CPC .......... H01M 8/18; H01M 8/188; H01M 8/20; Y02E 60/528
See application file for complete search history.

(56) References Cited

U.S. PATENT DOCUMENTS 2,353,782 A    7/1944  Neumark
2,415,792 A    2/1947  Gravell
(Continued)

FOREIGN PATENT DOCUMENTS

CN    1284208 A      2/2001
CN    102142571 A    8/2011
(Continued)

OTHER PUBLICATIONS

Asahi Glass Co., Ltd., "Selemion™ Ion Exchange Membranes," retrieved from http://www.selemion.com/SELC.pdf; accessed on Mar. 4, 2016.
(Continued)

*Primary Examiner* — Raymond Alejandro
(74) *Attorney, Agent, or Firm* — McDermott Will & Emery LLP

(57) ABSTRACT

The invention concerns flow batteries comprising: a first aqueous electrolyte comprising a first redox active material; a second aqueous electrolyte comprising a second redox active material; a first electrode in contact with the first aqueous electrolyte; a second electrode in contact with the second aqueous electrolyte and a separator disposed between the first aqueous electrolyte and the second aqueous electrolyte; the flow battery having an open circuit potential of at least 1.4 V, and is capable of operating or is operating at a current density at least about 50 mA/cm$^2$, wherein both
(Continued)

of the first and second redox active materials remain soluble in both the charged and discharged states. In certain embodiments, the redox active materials are metal ligand coordination compounds. The disclosure also describes systems comprising these flow batteries and methods of them.

22 Claims, 17 Drawing Sheets

Related U.S. Application Data of application No. 13/795,878, filed on Mar. 12, 2013, now Pat. No. 8,753,761.

(60) Provisional application No. 61/739,155, filed on Dec. 19, 2012, provisional application No. 61/739,145, filed on Dec. 19, 2012, provisional application No. 61/738,546, filed on Dec. 18, 2012, provisional application No. 61/683,260, filed on Aug. 15, 2012, provisional application No. 61/676,473, filed on Jul. 27, 2012.

(56) References Cited

U.S. PATENT DOCUMENTS

| | | |
|---|---|---|
| 3,294,588 A | 12/1966 | Morton |
| 3,573,984 A | 4/1971 | Shah |
| 3,707,449 A | 12/1972 | Reinhardt et al. |
| 3,876,435 A | 4/1975 | Dollman |
| 3,919,000 A | 11/1975 | Yarrington |
| 3,929,506 A | 12/1975 | Leddy et al. |
| 3,985,517 A | 10/1976 | Johnson |
| 3,985,571 A | 10/1976 | Reinhardt et al. |
| 3,985,585 A | 10/1976 | Tuttle et al. |
| 4,046,861 A | 9/1977 | Reinhardt et al. |
| 4,064,324 A | 12/1977 | Eustace |
| 4,069,371 A | 1/1978 | Zito |
| 4,126,529 A | 11/1978 | DeBerry |
| 4,133,941 A | 1/1979 | Sheibley |
| 4,180,623 A | 12/1979 | Adams |
| 4,233,144 A | 11/1980 | Pace et al. |
| 4,362,791 A | 12/1982 | Kaneko et al. |
| 4,378,995 A | 4/1983 | Gratzfeld et al. |
| 4,410,606 A | 10/1983 | Loutfy et al. |
| 4,436,711 A | 3/1984 | Olson |
| 4,436,712 A | 3/1984 | Olson |
| 4,436,713 A | 3/1984 | Olson |
| 4,436,714 A | 3/1984 | Olson |
| 4,443,423 A | 4/1984 | Olson |
| 4,443,424 A | 4/1984 | Olson |
| 4,468,441 A | 8/1984 | D'Agostino et al. |
| 4,485,154 A | 11/1984 | Remick et al. |
| 4,520,083 A | 5/1985 | Prater et al. |
| 4,563,403 A | 1/1986 | Julian |
| 4,592,973 A | 6/1986 | Pemsler et al. |
| 4,617,244 A | 10/1986 | Greene |
| 4,818,646 A | 4/1989 | Takakubo et al. |
| 4,952,289 A | 8/1990 | Ciccone et al. |
| 4,959,135 A | 9/1990 | Zenner et al. |
| 5,258,109 A | 11/1993 | Vaughan |
| 5,264,097 A | 11/1993 | Vaughan |
| 5,310,608 A | 5/1994 | Ishizawa et al. |
| 5,318,865 A | 6/1994 | Kaneko et al. |
| 5,433,934 A | 7/1995 | Chang et al. |
| 5,472,807 A | 12/1995 | Licht et al. |
| 5,643,670 A | 7/1997 | Chung |
| 5,656,390 A | 8/1997 | Kageyama et al. |
| 5,679,239 A | 10/1997 | Blum et al. |
| 5,759,711 A | 6/1998 | Miyabayashi et al. |
| 5,785,841 A | 7/1998 | Tseng |
| 5,876,581 A | 3/1999 | Itaya et al. |
| 5,910,366 A | 6/1999 | Chowdhury et al. |
| 6,030,517 A | 2/2000 | Lincot et al. |
| 6,054,230 A | 4/2000 | Kato |
| 6,143,443 A | 11/2000 | Kazacos et al. |
| 6,461,772 B1 | 10/2002 | Miyake et al. |
| 6,475,661 B1 | 11/2002 | Pellegri et al. |
| 6,485,868 B1 | 11/2002 | Tsujioka et al. |
| 6,555,989 B1 | 4/2003 | Pearson |
| 6,624,328 B1 | 9/2003 | Guerra |
| 7,046,418 B2 | 5/2006 | Lin et al. |
| 7,193,764 B2 | 3/2007 | Lin et al. |
| 7,252,905 B2 | 8/2007 | Clarke et al. |
| 7,265,162 B2 | 9/2007 | Yandrasits et al. |
| 7,348,088 B2 | 3/2008 | Hamrock et al. |
| 7,463,917 B2 | 12/2008 | Martinez |
| 7,508,568 B2 | 3/2009 | Lin et al. |
| 7,550,231 B2 | 6/2009 | Stauffer |
| 7,557,164 B2 | 7/2009 | Felix et al. |
| 7,625,663 B2 | 12/2009 | Clarke et al. |
| 7,645,540 B2 | 1/2010 | Boone et al. |
| 7,678,728 B2 | 3/2010 | Olson et al. |
| 7,745,056 B2 | 6/2010 | Lee et al. |
| 7,767,777 B2 | 8/2010 | Buesing et al. |
| 7,927,731 B2 | 4/2011 | Sahu |
| 7,931,981 B2 | 4/2011 | Boone et al. |
| 7,935,366 B2 | 5/2011 | Pahuja et al. |
| 7,998,335 B2 | 8/2011 | Feeney et al. |
| 8,129,554 B2 | 3/2012 | Schwaiger |
| 8,187,441 B2 | 5/2012 | Evans et al. |
| 8,691,413 B2 | 4/2014 | Esswein et al. |
| 8,753,761 B2 | 6/2014 | Esswein et al. |
| 2002/0083643 A1 | 7/2002 | Amendola et al. |
| 2002/0146618 A1 | 10/2002 | Licht |
| 2002/0177042 A1 | 11/2002 | Amendola |
| 2003/0228394 A1 | 12/2003 | Abdel-Monem et al. |
| 2004/0096746 A1 | 5/2004 | Wietelmann et al. |
| 2005/0098437 A1 | 5/2005 | Shiepe |
| 2005/0244707 A1 | 11/2005 | Skyllas-Kazacos et al. |
| 2006/0063065 A1 | 3/2006 | Clarke et al. |
| 2007/0275291 A1 | 11/2007 | Gu et al. |
| 2008/0274385 A1 | 11/2008 | Creeth |
| 2008/0292964 A1 | 11/2008 | Kazacos et al. |
| 2009/0110998 A1 | 4/2009 | Miyachi et al. |
| 2009/0130525 A1 | 5/2009 | Miyachi et al. |
| 2009/0208807 A1 | 8/2009 | Miyachi et al. |
| 2009/0308752 A1 | 12/2009 | Evans et al. |
| 2010/0003586 A1 | 1/2010 | Sahu |
| 2010/0059388 A1 | 3/2010 | Clarke et al. |
| 2010/0086823 A1 | 4/2010 | Koshino et al. |
| 2010/0239946 A1 | 9/2010 | Miyachi et al. |
| 2011/0014532 A1 | 1/2011 | Knuckey et al. |
| 2011/0136016 A1 | 6/2011 | Huang et al. |
| 2011/0189549 A1 | 8/2011 | Sun et al. |
| 2011/0195283 A1 | 8/2011 | Sun et al. |
| 2011/0200890 A1 | 8/2011 | Kocherginsky |
| 2011/0223450 A1 | 9/2011 | Horne et al. |
| 2011/0244277 A1 | 10/2011 | Gordon, II et al. |
| 2011/0244367 A1 | 10/2011 | Watahiki et al. |
| 2012/0052347 A1 | 3/2012 | Wilson et al. |
| 2012/0077066 A1 | 3/2012 | Zhang |
| 2012/0077095 A1 | 3/2012 | Roumi et al. |
| 2012/0107661 A1* | 5/2012 | Lee ............... B60L 11/005 429/107 |
| 2012/0135278 A1 | 5/2012 | Yoshie et al. |
| 2012/0171541 A1 | 7/2012 | Park et al. |
| 2012/0183868 A1 | 7/2012 | Toussaint et al. |
| 2012/0196188 A1 | 8/2012 | Zhang et al. |
| 2012/0202099 A1 | 8/2012 | Perry et al. |
| 2012/0244406 A1 | 9/2012 | Xia et al. |
| 2012/0263990 A1 | 10/2012 | Kim |
| 2013/0004819 A1 | 1/2013 | Mun et al. |
| 2013/0157087 A1 | 6/2013 | Pandy et al. |
| 2013/0252062 A1 | 9/2013 | Wilkins et al. |
| 2013/0252137 A1 | 9/2013 | Zhang et al. |
| 2014/0004403 A1* | 1/2014 | Yan ............... H01M 8/20 429/107 |
| 2014/0028260 A1 | 1/2014 | Goeltz et al. |
| 2014/0028261 A1 | 1/2014 | Esswein et al. |
| 2014/0030631 A1 | 1/2014 | Esswein et al. |

(56) References Cited

U.S. PATENT DOCUMENTS

| | | | |
|---|---|---|---|
| 2014/0051002 A1 | 2/2014 | Esswein et al. | |
| 2014/0051003 A1 | 2/2014 | Esswein et al. | |
| 2014/0138576 A1 | 5/2014 | Esswein et al. | |

FOREIGN PATENT DOCUMENTS

| | | | |
|---|---|---|---|
| CN | 102203984 A | 9/2011 | |
| CN | 102544526 | 7/2012 | |
| CN | 102790233 A | 11/2012 | |
| EP | 0013113 A1 | 7/1980 | |
| EP | 0595688 A1 | 5/1994 | |
| EP | 0814527 | 4/2002 | |
| EP | 1 411 576 | 4/2004 | |
| EP | 1 901 379 | 3/2008 | |
| EP | 1 290 068 | 8/2010 | |
| EP | 2 235 781 | 10/2012 | |
| EP | 2463950 | 8/2013 | |
| FR | 1533662 A | 7/1968 | |
| GB | 1 354 886 | 6/1974 | |
| JP | S 52-114934 A | 9/1977 | |
| JP | S 54-090538 A | 7/1979 | |
| JP | S 55-113274 A | 9/1980 | |
| JP | S 63-053860 A | 3/1988 | |
| JP | H 03-245472 A | 11/1991 | |
| JP | H 06-140082 A | 5/1994 | |
| JP | H 08-185868 A | 7/1996 | |
| JP | H 08-287938 A | 11/1996 | |
| JP | H-11-260390 | 9/1999 | |
| JP | 2002-216833 A | 8/2002 | |
| JP | 2006-254682 A | 9/2006 | |
| JP | 2008-305559 A | 12/2008 | |
| JP | 2012-009448 A | 1/2012 | |
| JP | 2012-079878 A | 4/2012 | |
| SU | 176574 | 11/1965 | |
| WO | WO 2004/095602 | 11/2004 | |
| WO | WO 2006/135958 | 12/2006 | |
| WO | WO 2007/044852 | 4/2007 | |
| WO | WO 2007/101284 | 9/2007 | |
| WO | WO 2011/075135 | 6/2011 | |
| WO | WO-2011/098781 A1 | 8/2011 | |
| WO | WO-2011/111717 A1 | 9/2011 | |
| WO | WO 2011/149624 | 12/2011 | |
| WO | WO-2012/027161 A2 | 3/2012 | |
| WO | WO-2012/075810 A1 | 6/2012 | |
| WO | WO-2012/117543 A1 | 9/2012 | |
| WO | WO-2012/134553 A2 | 10/2012 | |
| WO | WO-2012/162383 A1 | 11/2012 | |
| WO | WO 2013/006427 | 1/2013 | |
| WO | WO 2013/048603 | 4/2013 | |
| WO | WO-2014/018495 A2 | 1/2014 | |
| WO | WO-2014/018589 A1 | 1/2014 | |

OTHER PUBLICATIONS

International Patent Application No. PCT/US2013/051606: International Search Report and Written Opinion dated Dec. 9, 2013, 12 pages.
International Patent Application No. PCT/US2013/051767: International Search Report and Written Opinion dated Dec. 23, 2013, 7 pages.
International Patent Application No. PCT/US2013/051774: International Search Report and Written Opinion dated Dec. 23, 2013, 9 pages.
International Patent Application No. PCT/US2013/051790 International Search Report and Written Opinion dated Dec. 20, 2013, 7 pages.
International Patent Application No. PCT/US2013/051802: International Search Report and Written Opinion dated Dec. 23, 2013, 9 pages.
Borgias et al., "Synthetic, structural, and physical studies of titanium complexes of catechol and 3,5-di-tert-butylcatechol," Inorg. Chem., Apr. 1984, 23(8), 1009-1016.
Brezina et al., "Study of the reduction of oxygen on a carbon paste electrode in an alkaline medium," Coll. Czech. Chem. Commun., 1973, 38(10), 3024-3031.
Caulton, K. G., "Systematics and Future Projections Concerning Redox-Noninnocent Amide/Imine Ligands," Eur. J. Inorg. Chem., Jan. 2012, 2012(3), 435-443.
Chen et al., "Solution Redox Couples for Electrochemical Energy Storage: I. Iron (III)-Iron (II) Complexes with O-Phenanthroline and Related Ligands," Journal of the Electrochemical Society, Jul. 1981, 128(7), 1460-1467.
Cohen et al., "The Association of Ferrocyanide Ions With Various Cations," J. Phys. Chem., Aug. 1957, 61(8), 1096-1100.
Davies et al., "Electroceramics from Source Materials via Molecular Intermediates: PbTiO3 from TiO2 via [Ti(catecholate)3]2-," J. Am. Ceram. Soc., Aug. 1990, 73(8), 2570-2572.
Fryda et al., "Wastewater Treatment With Diamond Electrodes," Diamond Materials, Electrochemical Society Proceedings, 2000, 99(32), 473-483.
Gail, E. et al., "Cyano Compounds, Inorganic" in Ullmann's Encyclopedia of Industrial Chemistry, 2012, 10, 674-710.
Hollandsworth et al., "Zinc/Ferrocyanide Battery Development Phase IV" Lockheed Missiles and Space Company, Inc., Contractor report, Sandia Contract DE-AC04-76DP00789, May 1985, 278 pages.
Kim et al., "Novel catalytic effects of Mn3O4 for all vanadium redox flow batteries," Chem. Commun., Apr. 2012, 48(44), 5455-5457.
Kulesza et al., "Electrochemical preparation and characterization of hybrid films composed of Prussian blue type metal hexacyanoferrate and conducting polymer," Electrochimica Acta, Aug. 2001, 46(26-27), 4065-4073.
Modiba et al., "Electrochemical impedance spectroscopy study of Ce(IV) with aminopolycarboxylate ligands for redox flow batteries applications," Journal of Power Sources, May 2012, vol. 205, 1-9.
Modiba et al., "Electrochemical study of cerium(IV) in the presence of ethylenediaminetetraacetic acid (EDTA) and diethylenetriaminepentaacetate (DTPA) ligands," Journal of Applied Electrochemistry, Sep. 2008, 38(9), 1293-1299.
Modiba, P., "Electrolytes for redox flow battery systems," Dissertation presented for the degree of Doctor of Philosophy Chemistry at the University of Stellenbosch, Department of Chemistry and Polymer Science, Mar. 2010.
Nguyen et al., "Flow Batteries," The Electrochemical Society Interface, Fall 2010, 19(3), 54-56.
Pharr et al., "Infrared Spectroelectrochemical Analysis of Adsorbed Hexacyanoferrate Species Formed during Potential Cycling in the Ferrocyanide/Ferricyanide Redox Couple," Anal. Chem., Nov. 1997, 69(22), 4673-4679.
Raymond et al., "Coordination isomers of biological iron transport compounds. VI. Models of the enterobactin coordination site. A crystal field effect in the structure of potassium tris(catecholato)chromate(III) and—ferrate(III) sesquihydrates, K3[M(O2C6H4)3].1.5H2O, M=chromium, iron," J. Am. Chem. Soc., Mar. 1976, 98(7), 1767-1774.
Steenken et al., "One-electron redox potentials of phenols. Hydroxy- and aminophenols and related compounds of biological interest," J. Phys. Chem., Sep. 1982, 86(18), 3661-3667.
Torres-Gomez et al., "Energy Storage in Hybrid Organic-Inorganic Materials Hexacyanoferrate-Doped Polypyrrole as Cathode in Reversible Lithium Cells," J. of the Electrochemical Society, 2000, 147(7), 2513-2516.
Wang et al., "Determination of iron, titanium, osmium, and aluminum with tiron by reverse-phase high performance liquid chromatography/electrochemistry," Microchem. J., Jun. 1991, 43(3), 191-197.
Weber et al., "Redox flow batteries: a review," Journal of Applied Electrochemistry, Oct. 2011, 41(10), 1137-1164.
Leung, "Development of a Zinc-Cerium Redox Flow Battery," 2011 Doctoral Thesis, University of Southampton, 352 pages.
Leung, et al., "An undivided zinc-cerium redox flow battery operating at room temperature (295 K)," Electrochemistry Communications, 2011, vol. 13, pp. 770-773.

(56) References Cited

OTHER PUBLICATIONS

Leung, et al., "Ce(III)/Ce(iV) in methanesulfonic acid as the positive half cell of a redox flow battery," Electrochimica Acta, 2011, vol. 56, pp. 2145-2153.

Leung, et al., "Zinc deposition and dissolution in methanesulfonic acid onto a carbon composite electrode as the negative electrode reactions in a hybrid redox flow battery," Electrochimica Acta, 2011, vol. 56, pp. 6536-6546.

Leung, et al., Characterization of a zinc-cerium flow battery, Journal of Power Sources, 2011, vol. 195, pp. 5174-5185.

Sever, et al., "Visible Absorption Spectra of Metal-Catecholate and Metal-Tironate Complexes," Dalton Transactions, 2004, pp. 1061-1072.

Sigma-Aldrich, "Tris(hydroxymethyl)aminomethane," 2015, downloaded from <http://www.sigmaaldrich.com/catalog/products/sial/252859?lang=en&region=US>.

Vercillo, et al., "Solubility of Sodium Ferrocyanide in Sodium Hydroxide and Potassium Ferrocyanide in Potassium Hydroxide," University of Rochester, The David T. Kearns Center, Xerox Undergraduate Research Fellows Program, Jul. 28, 2011, 1 page.

Leung, et al., "Progress in redox flow batteries, remaining challenges and their applications in energy storage," RSC Advances, Jan. 2012, vol. 2, No. 27, pp. 10125-10156.

Bae, et al., "All-Chromium Redox Flow Battery for Renewable Energy Storage," Intenational Journal of Green Energy, Mar. 2011, pp. 248-264, vol. 8, No. 2.

Lessner, et al., "The Dependence of Aqueous Sulfur-Polysulfide Redox Potentialon Electrolyte Composition and Temperature," J Electrochem Soc. Jul. 1993, pp. 1847-1849, vol. 140, No. 7.

Trant, et al., "Solubility of Sodium Ferrocyanide and Potassium Ferrocyanide in Solugions of NaOH and KOH Mixtures at 25° C," University of Rochester Xerox Undregraduate Research Fellows Program, Jul. 2011, retrieved from https://rochester.edu/college/kearnscenter/pdf/xerox_2012/Trant-and_Vercillo_Poster.pdf.

Russian Office Action from Russian Patent Application No. 2015108957, dated Feb. 14, 2017.

Hirai, et al., "Thermocharge and Discharge Characteristics of Thermochargeable Galvanic Cells," T. IEE Japan, vol. 116-A, No. 5, pp. 412-418.

Negishi, "Redox Flow Battery," The Journal of Fuel Cell Technology, 2003, vol. 2, No. 4, pp. 69-74 (English language translation only).

Japanese Office Action from Japanese Patent Application No. 2015-524408, dated Jun. 6, 2017.

Japanese Office Action from Japanese Patent Application No. 2015-524111, dated Jun. 6, 2017.

Japanese Office Action from Japanese Patent Application No. 2015-524407, dated Jun. 6, 2017.

Chinese Office Action from Chinese Patent Application No. 201380050783.8, dated May 3, 2017.

Japanese Office Action from Japanese Patent Application No. 2015-524413, dispatched Jun. 20, 2017.

\* cited by examiner

ELECTROCHEMICAL ENERGY STORAGE SYSTEMS AND METHODS FEATURING HIGH OPEN CIRCUIT POTENTIAL

CROSS REFERENCE TO RELATED APPLICATIONS

This application claims priority to U.S. Patent Application Ser. No. 61/739,155 filed Dec. 19, 2012, and is a continuation-in-part of U.S. patent application Ser. No. 13/948,497, filed Jul. 23, 2013, which itself is a continuation-in-part from U.S. patent application Ser. No. 13/795,878, filed Mar. 12, 2013, which itself claims priority to U.S. Application Ser. No. 61/739,145, filed Dec. 19, 2012, U.S. Application Ser. No. 61/738,546, filed Dec. 18, 2012, U.S. Application Ser. No. 61/683,260, filed Aug. 15, 2012, and U.S. Application Ser. No. 61/676,473, filed Jul. 27, 2012, each of which is incorporated by reference in its entirety for all purposes.

TECHNICAL FIELD

This disclosure relates to the field of energy storage systems, including electrochemical energy storage systems, batteries, and flow battery systems and methods of operating the same.

BACKGROUND

There exists a long-felt need for safe, inexpensive, easy-to-use, and reliable technologies for energy storage. Large scale energy storage enables diversification of energy supply and optimization of the energy grid. Existing renewable-energy systems (e.g., solar- and wind-based systems) enjoy increasing prominence as energy producers explore non-fossil fuel energy sources, however storage is required to ensure a high quality energy supply when sunlight is not available and when wind does not blow.

Flow battery energy storage systems have been proposed for large-scale energy storage. But existing storage systems suffer from a variety of performance and cost limitations, including, for example, system scalability, round trip energy efficiencies ($RT_{Eff}$), cycle life, and other areas.

Despite significant development effort, no flow battery technology has yet achieved widespread commercial adoption, owing to the materials and engineering hurdles that make system economics unfavorable. Accordingly, there is a need in the art for improved flow batteries.

SUMMARY

The present invention addresses some of these challenges by providing flow battery electrochemical cells with aqueous, all-liquid active materials that operate with a high open circuit voltage (>1.4 V), through the design of novel electrolyte, active material, electrode, and cell compositions. High open circuit voltages result in increased system performance at lower costs through a number of mechanisms including increased energy density of the flow battery active materials, higher electrochemical cell/stack voltage efficiency, and decreased electrochemical cell/stack size. The all-liquid aspect of flow battery chemistry is important to yield high cell current density and low electrochemical stack cost. Increased active material energy density results in a reduced system volume, thus reducing costs associated with, for example, storage tanks, electrolyte pumps, and general system siting. Higher voltage efficiencies result in higher round-trip energy conversion efficiencies, while decreased cell/stack size results in increased modularity at lower costs.

Commercial flow batteries based on all-liquid active materials, e.g., those based on iron-chrome chemistries and vanadium couples, are limited to having open circuit voltages ("OCV") by their respective half-cell potentials—in the case of iron-chrome battery, to ca. 1.2 V and in the case of the $VO_2^+/VO^{2+}$ and $V^{3+/2+}$ couples to ca. 1.4 V. New flow battery chemistries that afford flow battery cells having larger open circuit potentials, with reasonable performance (e.g. current density, energy efficiency) have remained elusive.

This disclosure describes novel flow batteries that operate with high open circuit potentials (>1.4 V) and high performance (e.g. current density>50 mA/cm$^2$). The inventive aqueous flow batteries take advantage of active materials comprised of novel metal ligand coordination compounds for energy storage. As such, these flow batteries configurations have the promise of lowering the cost of large-scale energy storage.

In one embodiment, the present disclosure provides, in one aspect, low-cost energy storage using aqueous, benign electrolytes and redox-active moieties that exhibit reversible electrochemistry and tunable redox potentials. This is achieved by a choice of electrolyte, active material, and electrode composition to yield efficient cells that operate at high voltages In some embodiments, the invention concerns flow batteries comprising: a first aqueous electrolyte comprising a first redox active material; a second aqueous electrolyte comprising a second redox active material; a first carbon electrode in contact with the first aqueous electrolyte; a second carbon electrode in contact with the second aqueous electrolyte and a separator disposed between the first aqueous electrolyte and the second aqueous electrolyte; the flow battery having an open circuit potential of at least 1.4 V, and wherein the flow battery is adapted such that the carbon electrodes remain essentially metal free during operation of the flow battery; wherein at least one of the first electrolyte and the second electrolyte has a pH range of from about 8 to about 13.

In certain embodiments, the invention concerns flow batteries comprising: a first aqueous electrolyte comprising a first redox active material; a second aqueous electrolyte comprising a second redox active material; a first electrode (optionally a carbon electrode) in contact with the first aqueous electrolyte; a second electrode (independently and optionally a carbon electrode) in contact with the second aqueous electrolyte and a separator disposed between the first aqueous electrolyte and the second aqueous electrolyte; wherein the flow battery having an open circuit potential of at least 1.4 V, and wherein the flow battery has an energy density of at least 30 watt hour/liter (Wh/L); wherein the battery is adapted such that the carbon electrodes remain essentially metal free during operation of the flow battery.

In yet another embodiments, the invention concerns flow battery comprising: a first aqueous electrolyte comprising a first redox active material; a second aqueous electrolyte comprising a second redox active material; a first carbon electrode in contact with the first aqueous electrolyte; a second carbon electrode in contact with the second aqueous electrolyte and a separator disposed between the first aqueous electrolyte and the second aqueous electrolyte; the flow battery having an open circuit potential of at least 1.4 V and a current density of at least 100 mA/cm$^2$; wherein the battery is adapted such that the carbon electrodes remain essentially metal free during operation of the flow battery.

The invention also concerns methods of charging a flow battery described herein with an associated flow of electrons by applying a potential difference across the negative and positive electrode, so as to (a) reduce the first redox active material; or (b) oxidize the second redox active material; or (c) or both (a) and (b).

Additionally, the invention concerns methods of discharging a flow battery described herein with an associated flow of electrons by applying a potential difference across the negative and positive electrode so as to (a) oxidize the first redox active material; or (b) reduce the second redox active material; or (c) or both (a) and (b).

The invention also concerns methods of operating a flow battery described herein, the method comprising charging said battery by the input of electrical energy or discharging said battery by the removal of electrical energy.

In another embodiment, the invention concerns methods of operating a flow battery described herein, the method comprising applying a potential difference across the first and second electrode, with an associated flow of electrons, so as to: (a) reduce the first redox active material while oxidizing the second redox active material; or (b) oxidize the first redox active material while reducing the second redox active material.

In other embodiments, the invention concerns systems comprising a flow battery described herein, and further comprising: (a) a first chamber containing the first aqueous electrolyte and a second chamber containing the second aqueous electrolyte; (b) at least one electrolyte circulation loop in fluidic communication each electrolyte chamber, said at least one electrolyte circulation loop comprising storage tanks and piping for containing and transporting the electrolytes; (c) control hardware and software; and (d) a power conditioning unit. The systems may be connected to an electrical grid configured to provide renewables integration, peak load shifting, grid firming, baseload power generation/consumption, energy arbitrage, transmission and distribution asset deferral, weak grid support, frequency regulation, or a combination thereof. In addition, the systems may be configured to provide stable power for remote camps, forward operating bases, off-grid telecommunications, or remote sensors.

DETAILED DESCRIPTION OF ILLUSTRATIVE EMBODIMENTS

Figure 1:
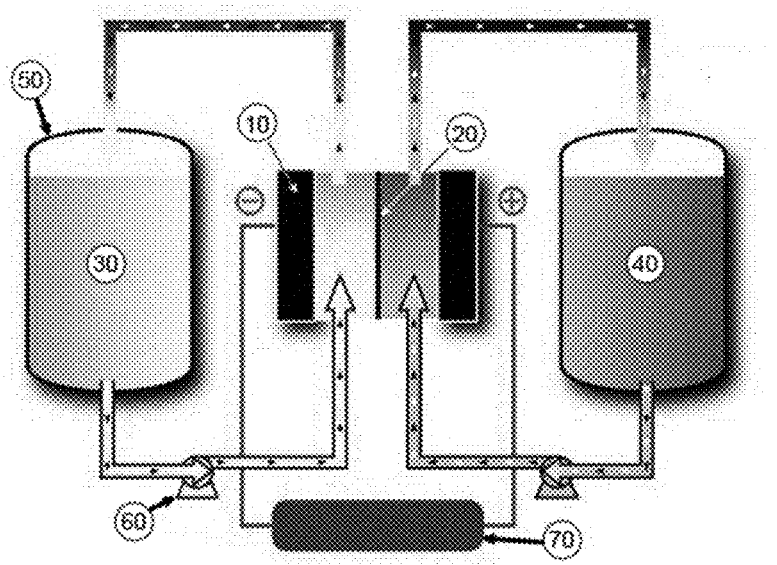
FIG. 1 depicts an exemplary flow battery.
Figure 2:
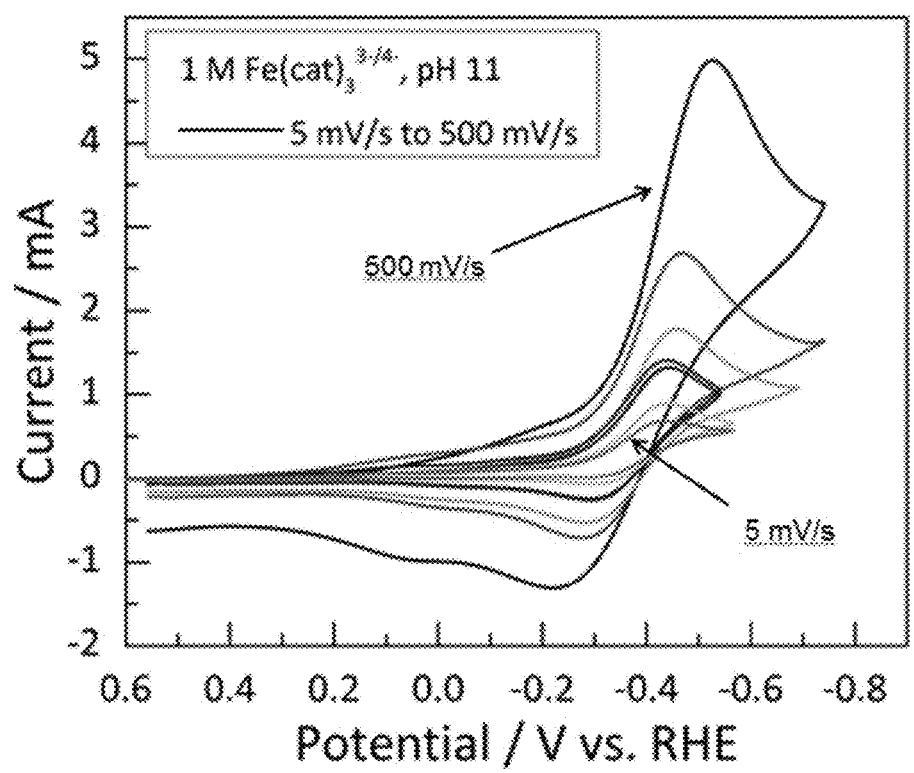
FIG. 2 provides CV traces for iron tris-catecholate over a range of operating potentials. The data were generated using solutions of 1M NaK[Fe(catecholate)$_3$] at a pH of 11, and 3 M Na/KCl, recorded at a glassy carbon electrode.
Figure 3:
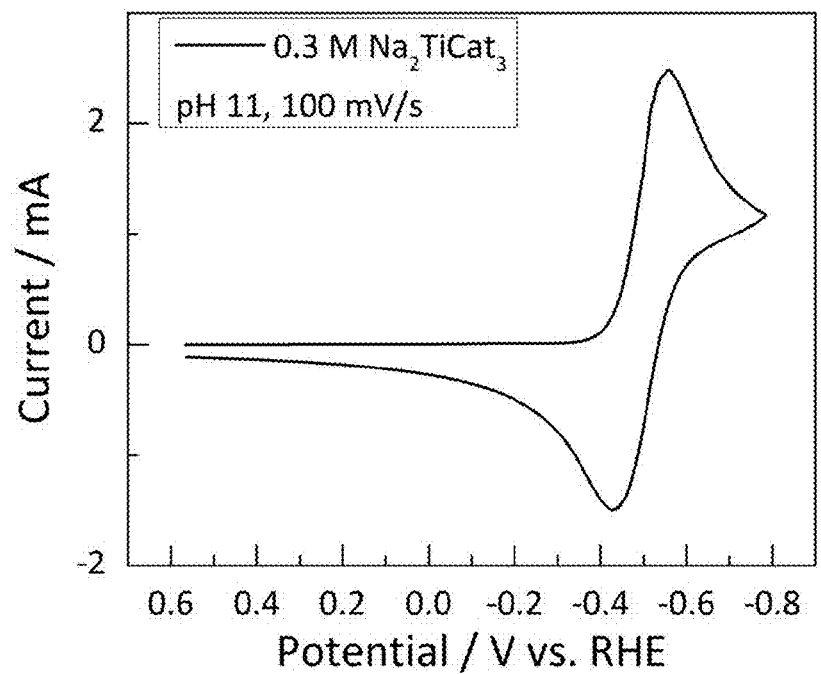
FIG. 3 provides a CV trace for titanium tris-catecholate over a range of operating potentials. The data were generated using solutions of 1.5 M Na$_2$[Ti(catecholate)$_3$] at a pH of 11, recorded at a glassy carbon electrode.
Figure 4:
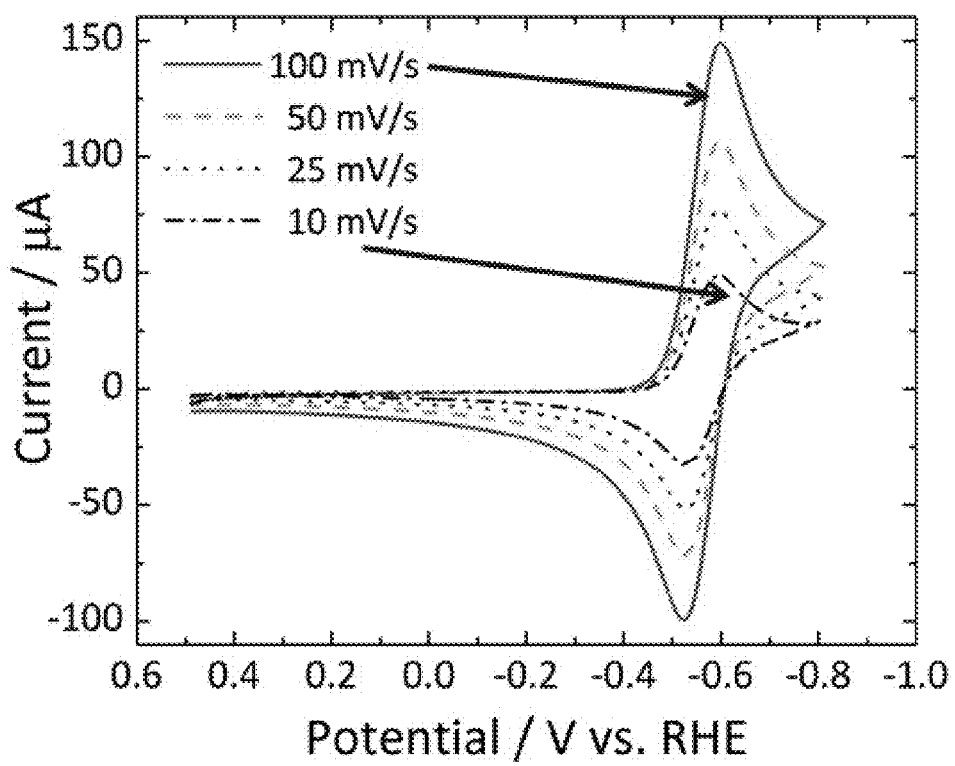
FIG. 4 provides CV traces for titanium tris-pyrogallate over a range of operating potentials. The data were generated using solutions of 75 mM NaK[Ti(pyrogallate)$_3$] at a pH of 9.8 and 1 M Na$_2$SO$_4$, recorded at a glassy carbon electrode.
Figure 5:
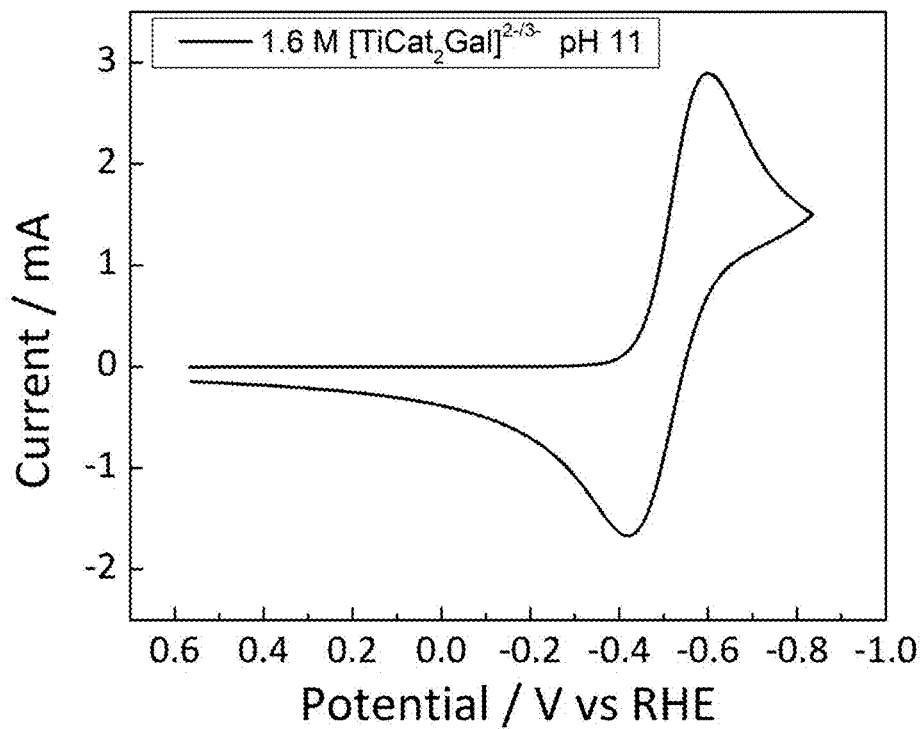
FIG. 5 provides a CV trace for titanium bis-catecholate mono-pyrogallate over a range of operating potentials. The data were generated using solutions of 1.6 M NaK[Ti(catecholate)$_2$(pyrogallate)] at a pH of 11, recorded at a glassy carbon electrode.
Figure 6:
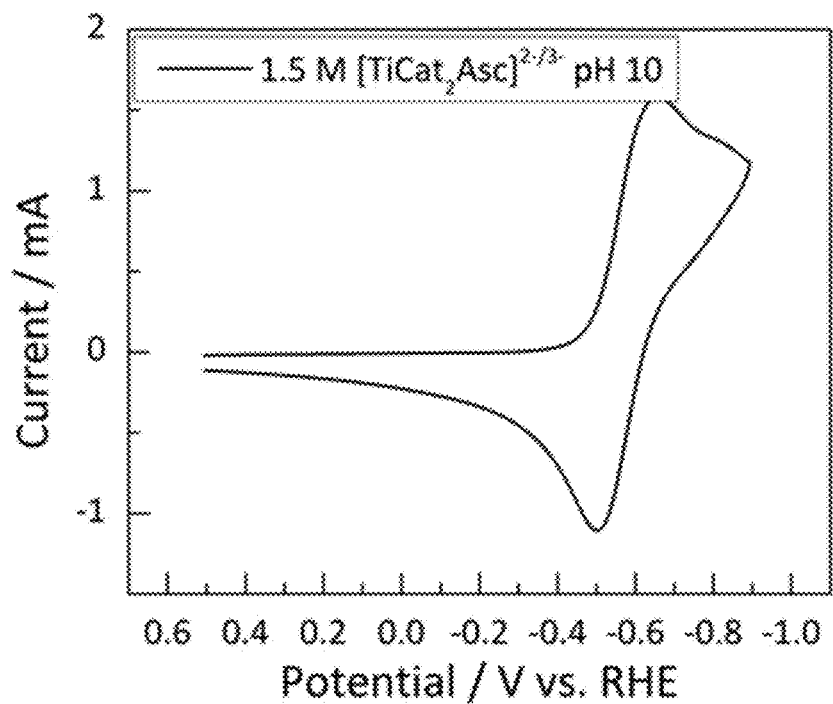
FIG. 6 provides a CV trace for titanium bis-catecholate mono-ascorbate over a range of operating potentials. The data were generated using solutions of 1.5 M NaK[Ti(catecholate)$_2$(ascorbate)] at a pH of 10, recorded at a glassy carbon electrode.
Figure 7:
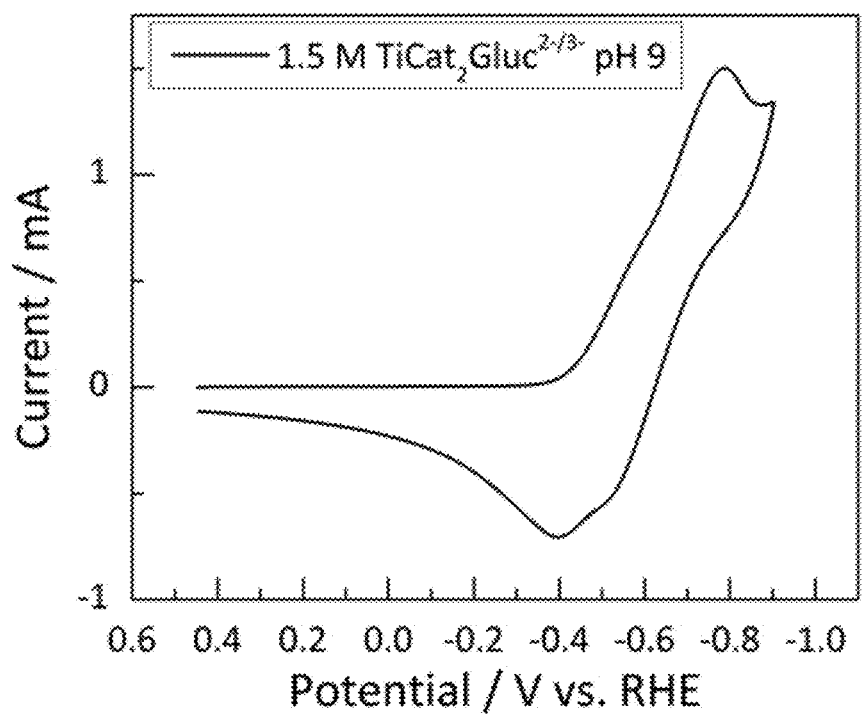
FIG. 7 provides a CV trace for titanium bis-catecholate mono-gluconate over a range of operating potentials. The data were generated using solutions of 1.5 M NaK[Ti(catecholate)$_2$(gluconate)] at a pH of 9, recorded at a glassy carbon electrode.
Figure 8:
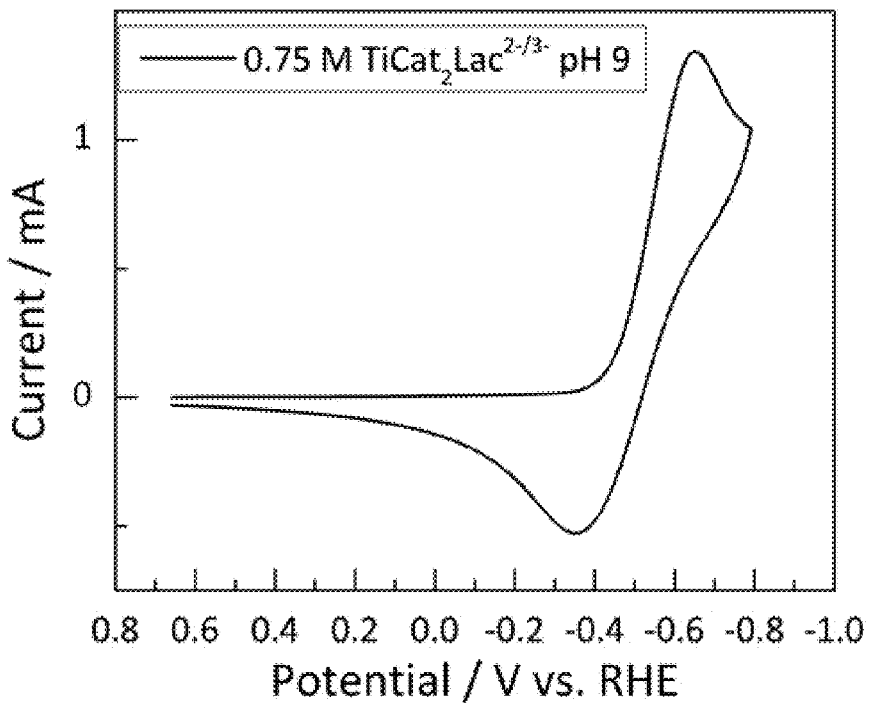
FIG. 8 provides a CV trace for titanium bis-catecholate monolactate over a range of operating potentials. The data were generated using solutions of 0.75 M NaK[Ti(catecholate)$_2$(lactate)] at a pH of 9, recorded at a glassy carbon electrode.
Figure 9:
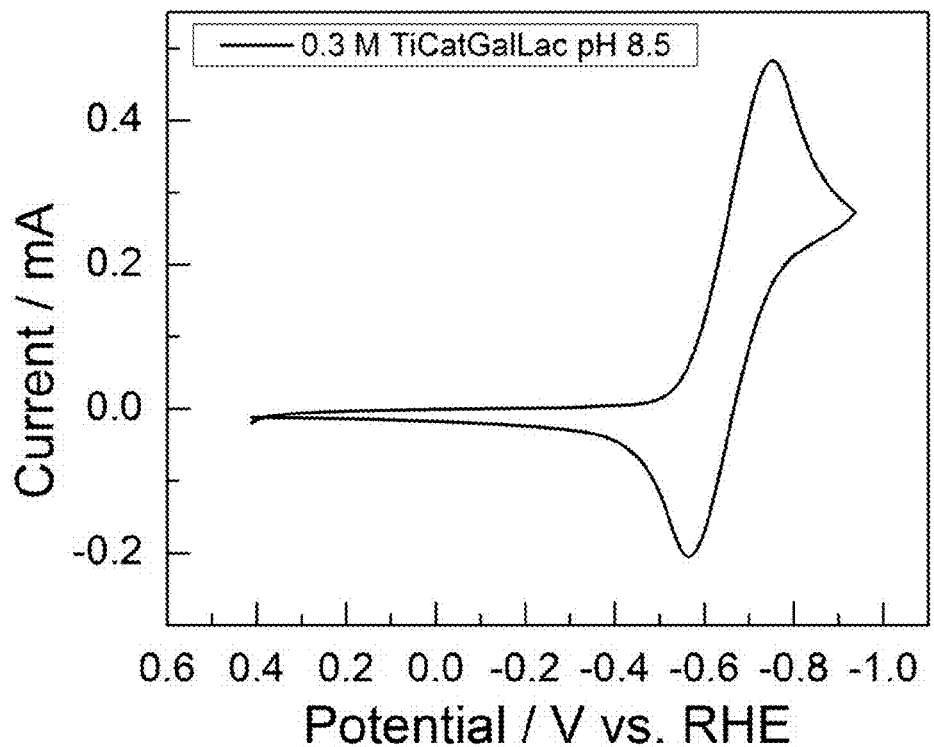
FIG. 9 provides a CV trace for titanium mono-catecholate mono-pyrogallate mono-lactate over a range of operating potentials. The data were generated using solutions of 1.5 M NaK[Ti(catecholate)(pyrogallate)(lactate)] at a pH of 8.5, recorded at a glassy carbon electrode.
Figure 10:
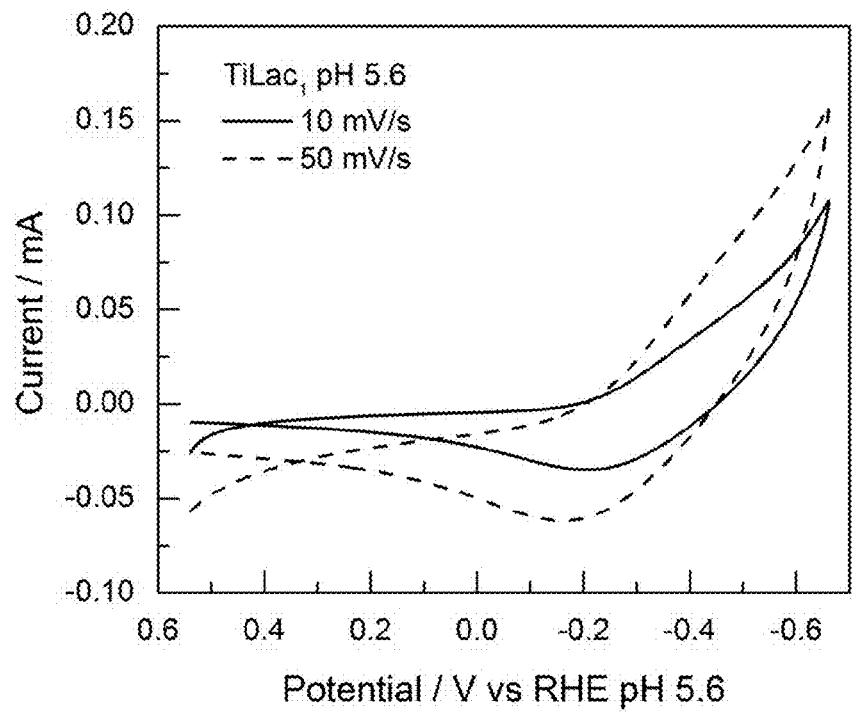
FIG. 10 provides CV traces for 10 mM titanium mono-lactate at pH 5.6 over a range of operating potentials, recorded at a glassy carbon electrode with NaKSO$_4$ supporting electrolyte.
Figure 11:
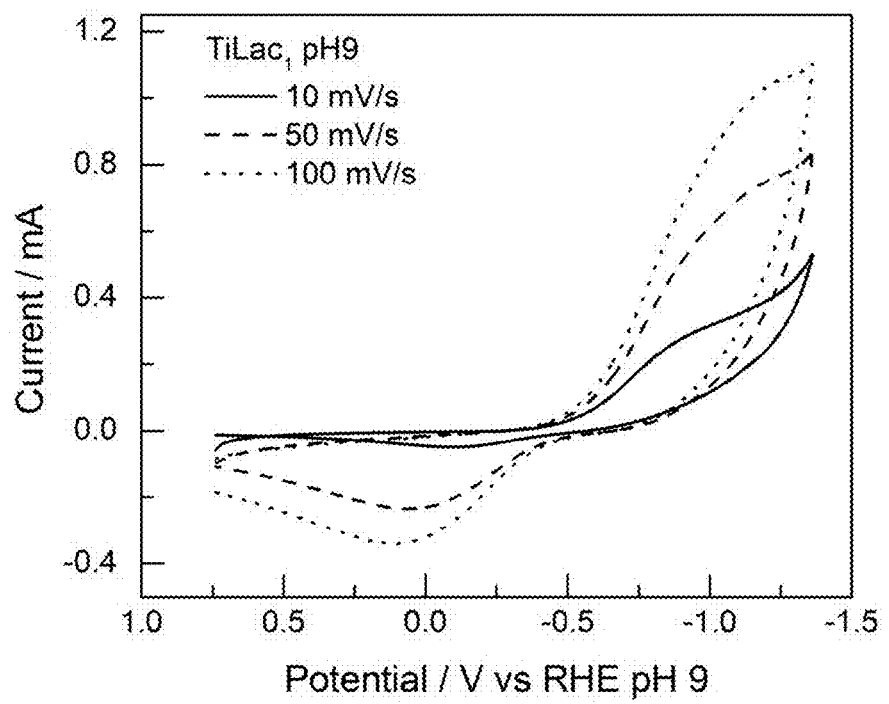
FIG. 11 provides CV traces for 1 M titanium mono-lactate at pH 9 over a range of operating potentials, recorded at a glassy carbon electrode with NaKSO$_4$ supporting electrolyte.
Figure 12:
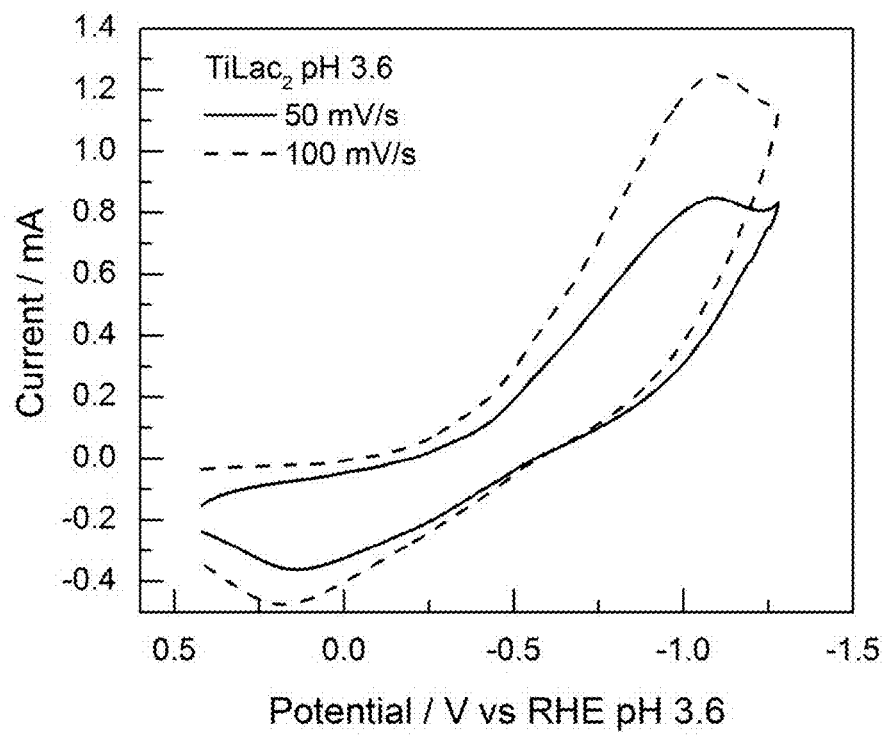
FIG. 12 provides CV traces for 1 M titanium bis-lactate at pH 3.6 over a range of operating potentials, recorded at a glassy carbon electrode with NaKSO$_4$ supporting electrolyte.
Figure 13:
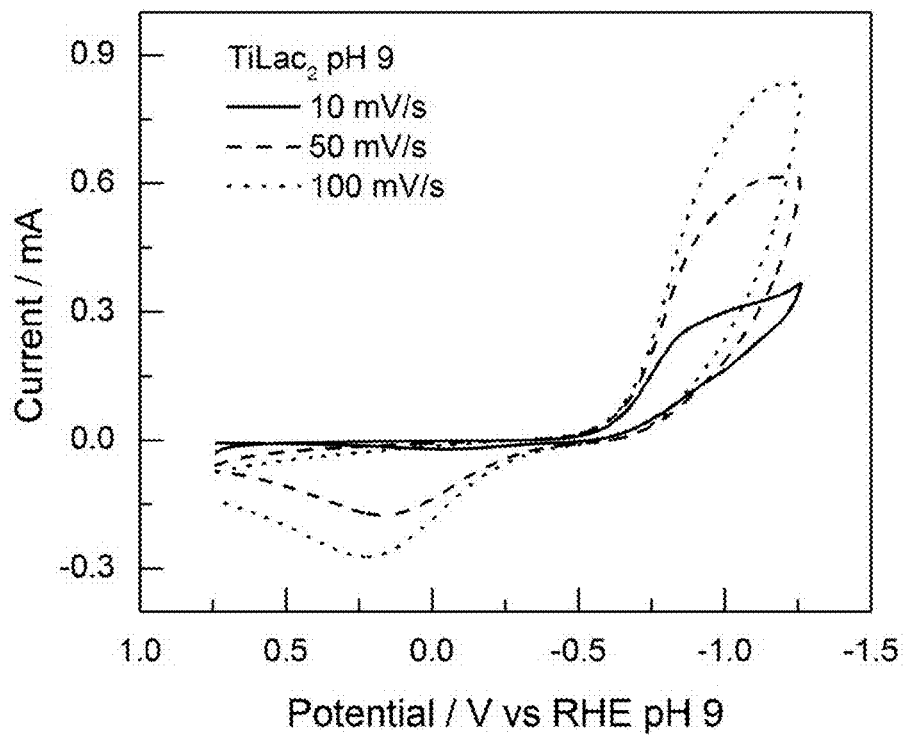
FIG. 13 provides CV traces for 0.75 M titanium bis-lactate at pH 9 over a range of operating potentials, recorded at a glassy carbon electrode with NaKSO$_4$ supporting electrolyte.
Figure 14:
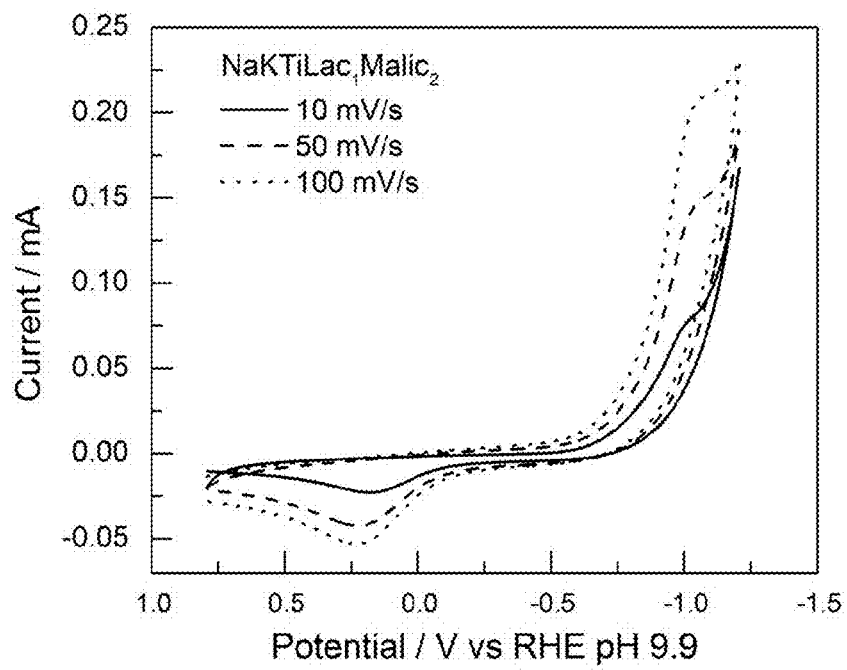
FIG. 14 provides CV traces for 100 mM titanium-bis-malate-mono-lactate at pH 9.9 over a range of operating potentials, recorded at a glassy carbon electrode with NaKSO$_4$ supporting electrolyte.
Figure 15:
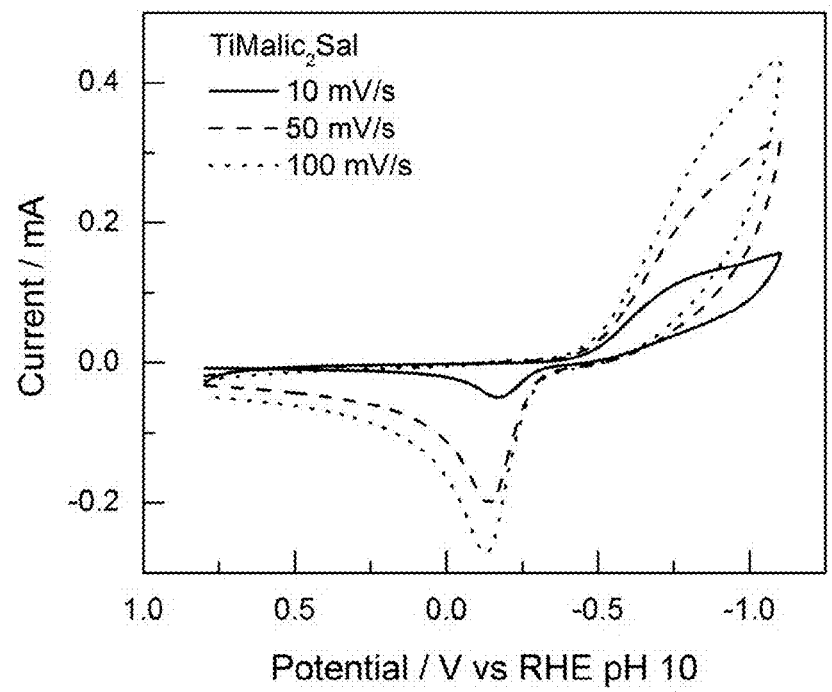
FIG. 15 provides CV traces for 200 mM titanium-bis-malate-mono-salicylate at pH 10 over a range of operating potentials, recorded at a glassy carbon electrode with NaKSO$_4$ supporting electrolyte.
Figure 16:
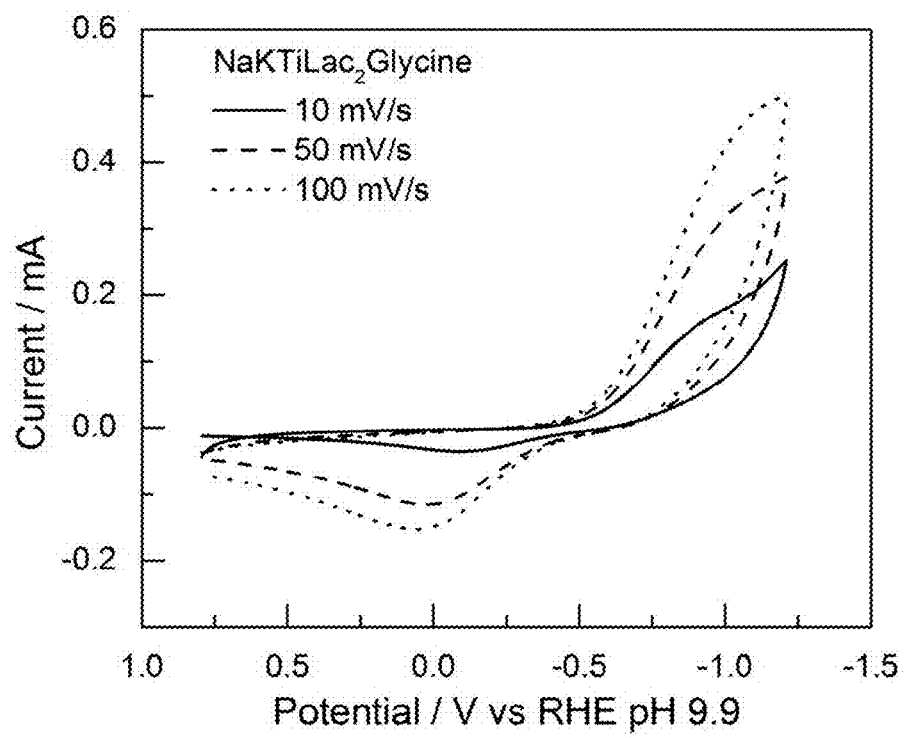
FIG. 16 provides CV traces for 0.5 M titanium bis-lactate mono-glycinate at pH 9.9 over a range of operating potentials, recorded at a glassy carbon electrode with NaKSO$_4$ supporting electrolyte.
Figure 17:
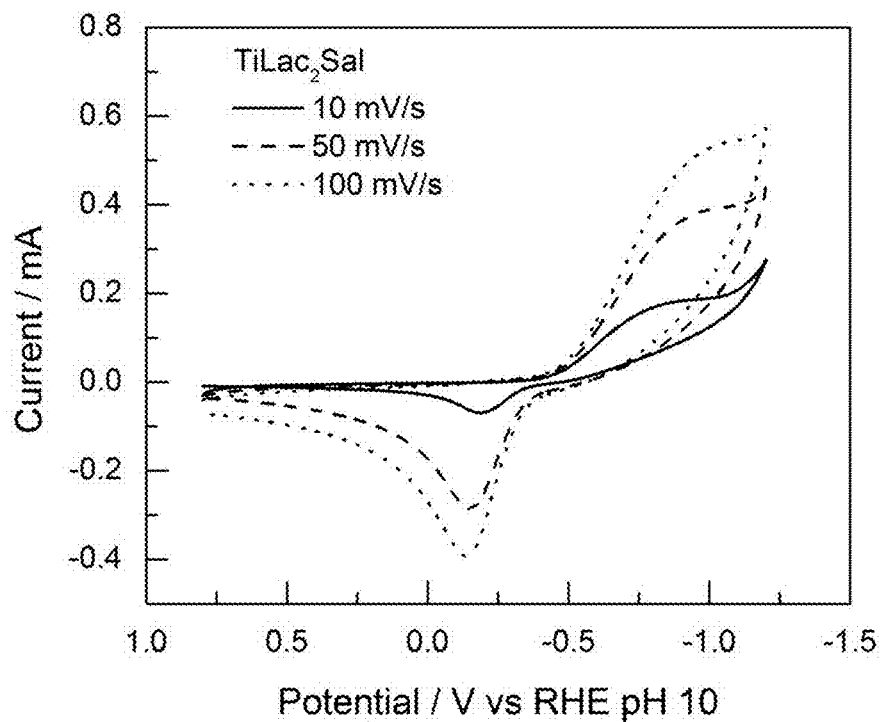
FIG. 17 provides CV traces for 0.5 M titanium bis-lactate mono-salicylate at pH 10 over a range of operating potentials, recorded at a pH of 9.3 at a glassy carbon electrode with NaKSO$_4$ supporting electrolyte.
Figure 18:
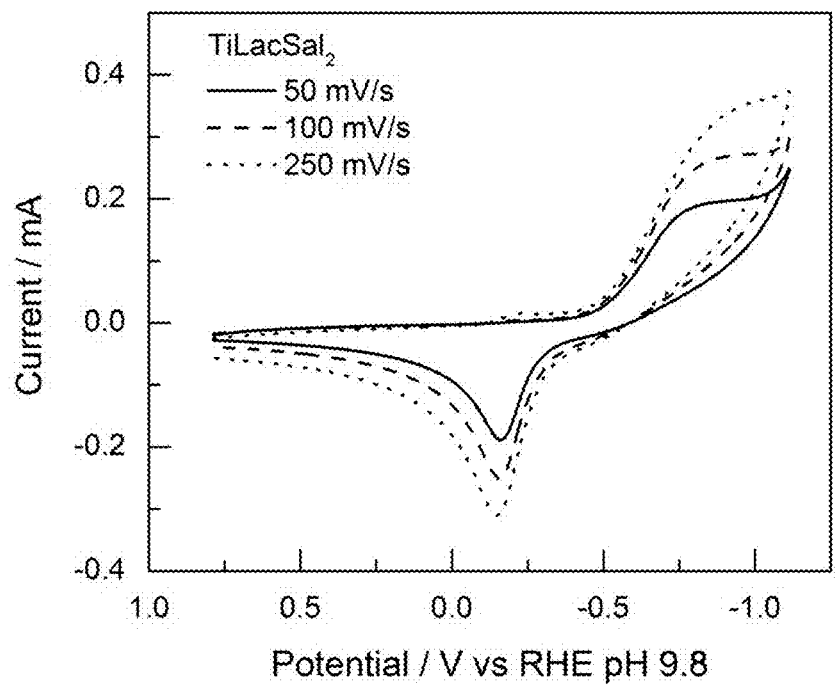
FIG. 18 provides CV traces for 0.5 M titanium bis-salicylate mono-lactate at pH 9.8 over a range of operating potentials, recorded at a glassy carbon electrode with NaKSO$_4$ supporting electrolyte.
Figure 19:
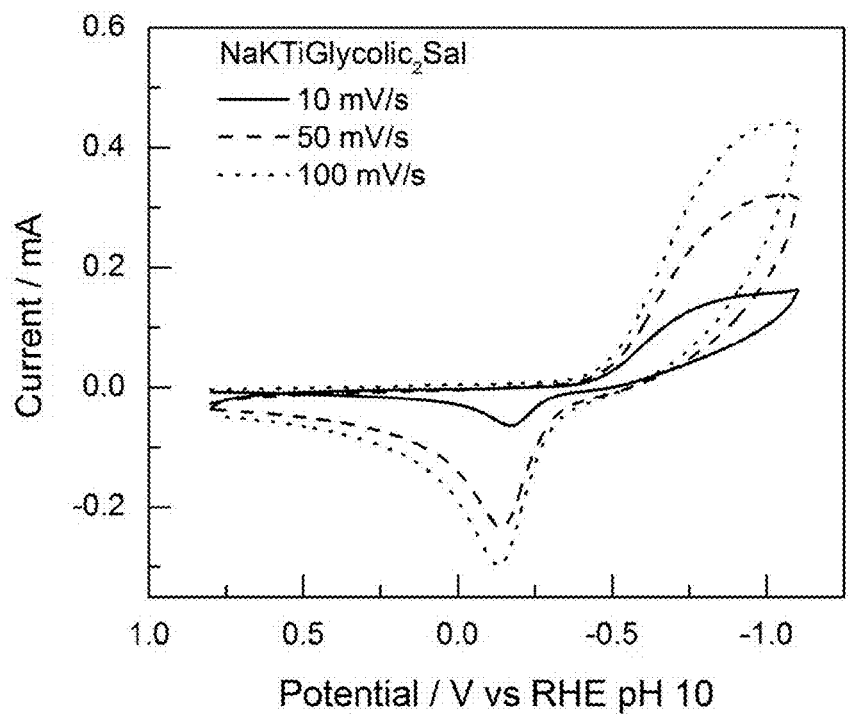
FIG. 19 provides CV traces for 200 mM titanium bis-(α-hydroxyacetate) mono-salicylate over a range of operating potentials, recorded at a pH of 10 at a glassy carbon electrode with NaKSO$_4$ supporting electrolyte.
Figure 20:
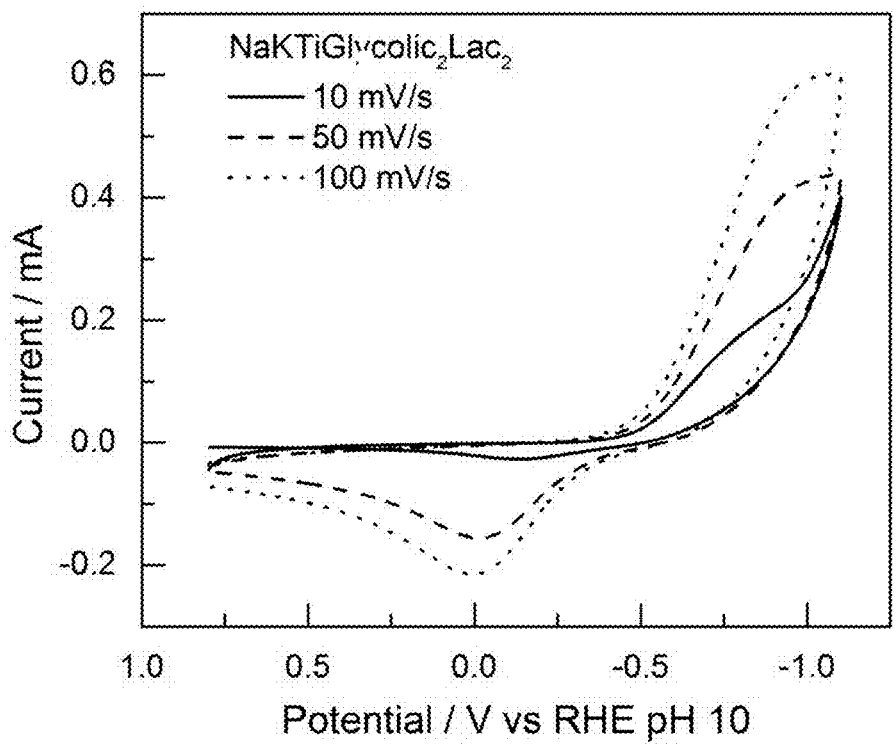
FIG. 20 provides CV traces for 0.5 M titanium bis-(α-hydroxyacetate) mono-lactate at pH 10 over a range of operating potentials at a glassy carbon electrode with NaKSO$_4$ supporting electrolyte.
Figure 21:
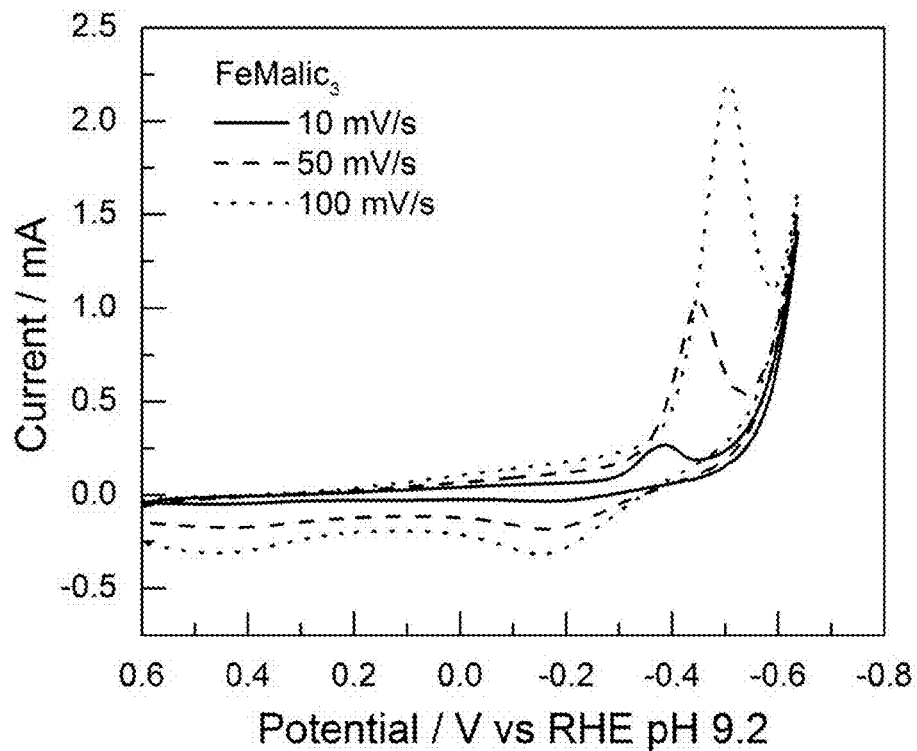
FIG. 21 provides CV traces for 1 M iron tris-malate at pH 9.2 over a range of operating potentials, recorded at a glassy carbon electrode with NaKSO$_4$ supporting electrolyte.
Figure 22:
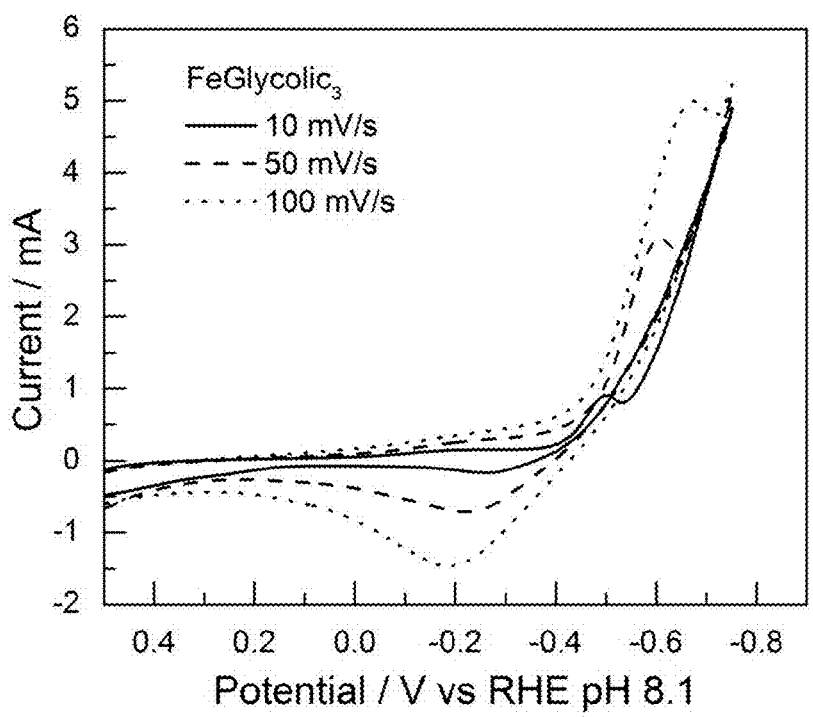
FIG. 22 provides CV traces for 1.5 M iron tris-(α-hydroxyacetate) at pH 8.1 over a range of operating potentials, recorded at a glassy carbon electrode with NaKSO$_4$ supporting electrolyte.
Figure 23:
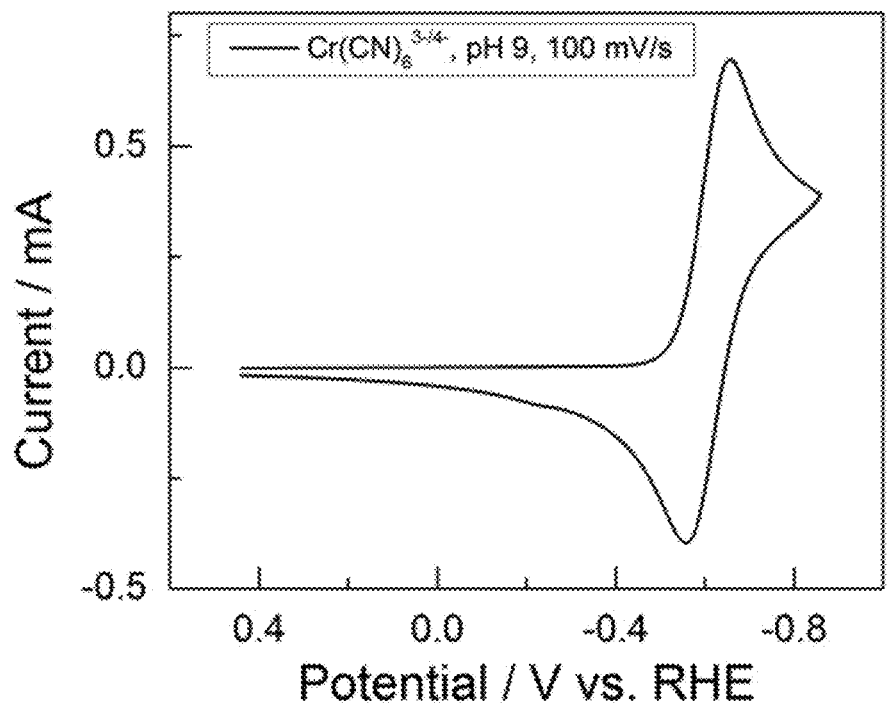
FIG. 23 provides a CV trace for chromium hexacyanide over a range of operating potentials. The data were generated using solutions of 0.05 M K$_3$[Cr(CN)$_6$] at a pH of 9, recorded at a glassy carbon electrode.
Figure 24:
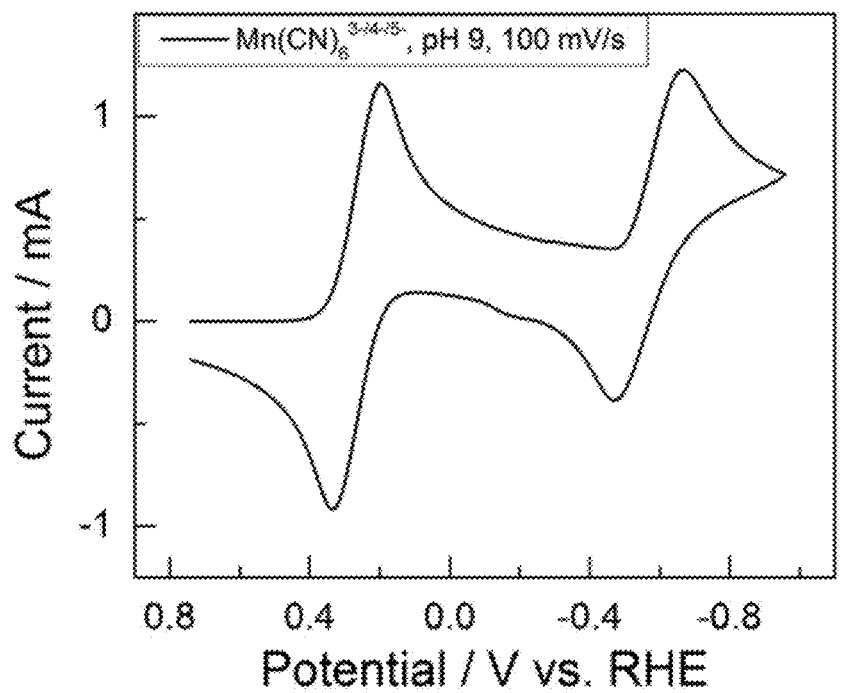
FIG. 24 provides a CV trace for manganese hexacyanide over a range of operating potentials. The data were generated using solutions of 0.1 M K$_3$[Mn(CN)$_6$] at a pH of 9, recorded at a glassy carbon electrode.
Figure 25:
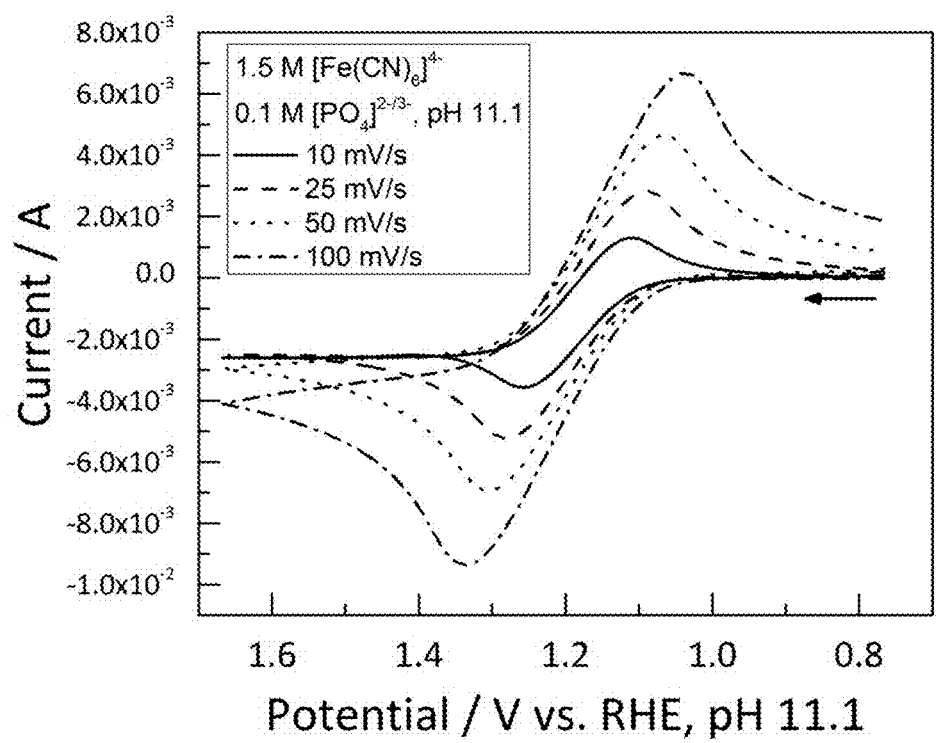
FIG. 25 provides a CV trace from a solution of 1.5 M [Fe(CN)$_6$]$^{4-}$ obtained at a glassy carbon disk working electrode at several scan rates using 0.1 M sodium potassium hydrogen phosphate as the supporting electrolyte, as described in Example 4.1. The ratio of Na$^+$/K$^+$ counterions in this example was ca. 1:1.
Figure 26:
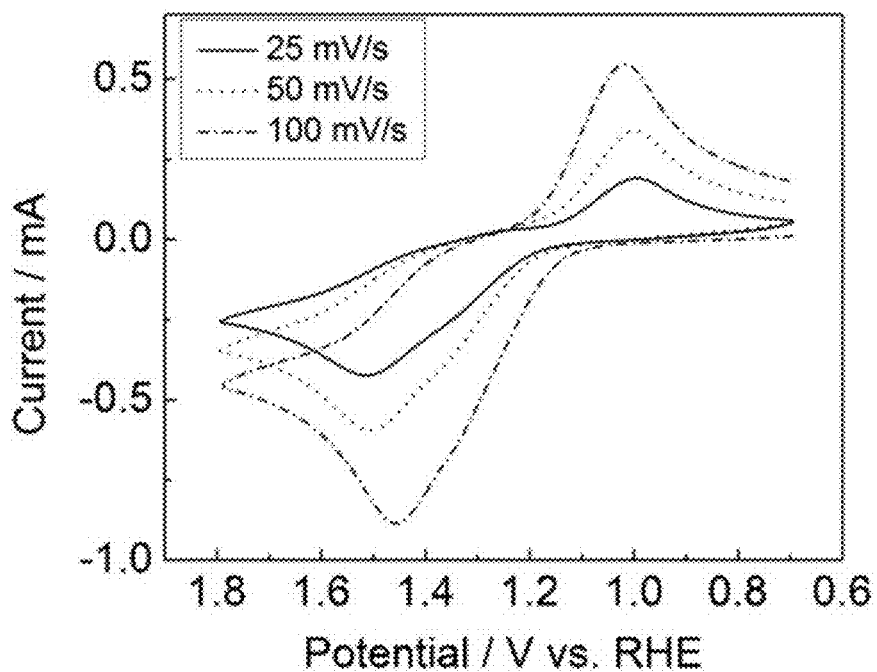
FIG. 26 provides cyclic voltammogram, CV, traces for Al(cit)$_2$(cat)$^{2-/3-}$ in pH 11.5 Na$_2$SO$_4$ electrolyte recorded at a glassy carbon electrode.

The present disclosure may be understood more readily by reference to the following description taken in connection with the accompanying Figures and Examples, all of which form a part of this disclosure. It is to be understood that this disclosure is not limited to the specific products, methods, conditions or parameters described and/or shown herein, and that the terminology used herein is for the purpose of describing particular embodiments by way of example only and is not intended to be limiting of any claimed disclosure. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods of operating a device and systems and to the devices and systems providing said methods. That is, where the disclosure describes and/or claims a method or methods for operating a flow battery, it is appreciated that these descriptions and/or claims also describe and/or claim the devices, equipment, or systems for accomplishing these methods.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself.

Electrochemical energy storage systems typically operate through the interconversion of electrical and chemical energy. Various embodiments of electrochemical energy storage systems include batteries, capacitors, reversible fuel cells and the like, and the present invention may comprise any one or combination of these systems.

Unlike typical battery technologies (e.g., Li-ion, Ni-metal hydride, lead-acid, etc.), where energy storage materials and membrane/current collector energy conversion elements are unitized in a single assembly, flow batteries transport (e.g., via pumping) redox active energy storage materials from storage tanks through an electrochemical stack, as in exemplary FIG. 1, which is described elsewhere herein in further detail. This design feature decouples the electrical energy storage system power (kW) from the energy storage capacity (kWh), allowing for considerable design flexibility and cost optimization.

In some embodiments, flow batteries according to the present disclosure may also be described in terms of a first chamber comprising a negative electrode contacting a first aqueous electrolyte; a second chamber comprising a positive electrode contacting a second aqueous electrolyte; and a separator disposed between the first and second electrolytes. The electrolyte chambers provide separate reservoirs within the cell, through which the first and/or second electrolyte flow so as to contact the respective electrodes and the separator. Each chamber and its associated electrode and electrolyte defines its corresponding half-cell. The separator provides several functions which include, e.g., (1) serving as a barrier to mixing of first and second electrolytes; (2) electronically insulating to reduce or prevent short circuits between the positive and negative electrodes; and (3) to provide for ion transport between the positive and negative electrolyte chambers, thereby balancing electron transport during charge and discharge cycles. The negative and positive electrodes provide a surface for electrochemical reactions during charge and discharge. During a charge or discharge cycle, electrolytes may be transported from separate storage tanks through the corresponding electrolyte chambers. In a charging cycle, electrical power is applied to the system wherein the active material contained in the second electrolyte undergoes a one-or-more electron oxidation and the active material in the first electrolyte undergoes a one-or-more electron reduction. Similarly, in a discharge cycle the second electrolyte is reduced and the first electrolyte is oxidized producing electrical power.

To this point, the various embodiments have been described mainly in terms of individual flow batteries. It should be appreciated that, where possible, the descriptions should be read as including flow batteries that are operating or capable of operating with the specified characteristics. Similarly, the descriptions should be read as including systems of flow batteries, wherein the system comprises at least two of the flow batteries described herein.

An exemplary flow battery is shown in FIG. 1. As shown in that figure, a flow battery system may include an electrochemical cell that features a separator 20 (e.g., a membrane) that separates the two electrodes of the electrochemical cell. Electrode 10 is suitably a conductive material, such as a metal, carbon, graphite, and the like. Tank 50 may contain first redox material 30, which material is capable of being cycled between an oxidized and reduced state.

A pump 60 may effect transport of the first active material 30 from the tank 50 to the electrochemical cell. The flow battery also suitably includes a second tank (not labeled) that contains the second active material 40. The second active material 40 may or may not be the same as active material 30. A second pump (not labeled) may effect transport of second redox material 40 to the electrochemical cell. Pumps may also be used to effect transport of the active materials from the electrochemical cell to the tanks of the system. Other methods of effecting fluid transport—e.g., siphons—may be used to transport redox material into and out of the electrochemical cell. Also shown is a power source or load 70, which completes the circuit of the electrochemical cell and allows the user to collect or store electricity during operation of the cell.

It should be understood that FIG. 1 depicts a specific, non-limiting embodiment of a flow battery. Accordingly, devices according to the present disclosure may or may not include all of the aspects of the system depicted in FIG. 1. As one example, a system according to the present disclosure may include active materials that are solid, liquid, or gas and/or solids, liquids, or gases dissolved in solution. Active materials may be stored in a tank, in a vessel open to the atmosphere, or simply vented to the atmosphere.

In some cases, a user may desire to provide higher charge or discharge voltages than available from a single battery. In such cases, and in certain embodiments, then, several batteries are connected in series such that the voltage of each cell is additive. An electrically conductive, but non-porous material (e.g., a bipolar plate) may be employed to connect adjacent battery cells in a bipolar stack, which allows for electron transport but prevents fluid or gas transport between adjacent cells. The positive electrode compartments and negative electrode compartments of individual cells are suitably fluidically connected via common positive and negative fluid manifolds in the stack. In this way, individual electrochemical cells can be stacked in series to yield a desired operational voltage.

In additional embodiments, the cells, cell stacks, or batteries are incorporated into larger energy storage systems, suitably including piping and controls useful for operation of these large units. Piping, control, and other equipment suitable for such systems are known in the art, and include, for example, piping and pumps in fluid communication with the respective electrochemical reaction chambers for moving electrolytes into and out of the respective chambers and storage tanks for holding charged and discharged electrolytes. The energy storage and generation systems described by the present disclosure may also include electrolyte circulation loops, which loops may comprise one or more valves, one or more pumps, and optionally a pressure equalizing line. The energy storage and generation systems of this disclosure can also include an operation management system. The operation management system may be any suitable controller device, such as a computer or microprocessor, and may contain logic circuitry that sets operation of any of the various valves, pumps, circulation loops, and the like.

In some embodiments, a flow battery system may comprise a flow battery (including a cell or cell stack); storage tanks and piping for containing and transporting the electrolytes; control hardware and software (which may include safety systems); and a power conditioning unit. The flow battery cell stack accomplishes the conversion of charging and discharging cycles and determines the peak power of energy storage system, which power may in some embodiments be in the kW range. The storage tanks contain the positive and negative active materials; the tank volume determines the quantity of energy stored in the system, which may be measured in kWh. The control software, hardware, and optional safety systems suitably include sensors, mitigation equipment and other electronic/hardware controls and safeguards to ensure safe, autonomous, and efficient operation of the flow battery energy storage system. Such systems are known to those of ordinary skill in the art. A power conditioning unit may be used at the front end of the energy storage system to convert incoming and outgoing power to a voltage and current that is optimal for the energy storage system or the application. For the example of an energy storage system connected to an electrical grid, in a charging cycle the power conditioning unit would convert incoming AC electricity into DC electricity at an appropriate voltage and current for the electrochemical stack. In a discharging cycle, the stack produces DC electrical power and the power conditioning unit converts to AC electrical power at the appropriate voltage and frequency for grid applications.

The energy storage systems of the present disclosure are, in some embodiments, suited to sustained charge or discharge cycles of several hour durations. As such, the systems of the present disclosure may be used to smooth energy supply/demand profiles and provide a mechanism for stabilizing intermittent power generation assets (e.g., from renewable energy sources). It should be appreciated, then, that various embodiments of the present disclosure include those electrical energy storage applications where such long charge or discharge durations are valuable. For example, non-limiting examples of such applications include those where systems of the present disclosure are connected to an electrical grid include, so as to allow renewables integration, peak load shifting, grid firming, baseload power generation consumption, energy arbitrage, transmission and distribution asset deferral, weak grid support, and/or frequency regulation. Cells, stacks, or systems according to the present disclosure may be used to provide stable power for applications that are not connected to a grid, or a micro-grid, for example as power sources for remote camps, forward operating bases, off-grid telecommunications, or remote sensors.

Flow battery energy storage efficacy is determined by both the round trip DC-DC energy efficiency ($RT_{EFF}$) and the energy density of the active materials (measured in Wh/L). The $RT_{EFF}$ is a composite of voltage and current efficiencies for both the battery charge and discharge cycles. In electrochemical devices, voltage and current efficiencies are functions of the current density, and while voltage and current efficiency typically decrease as current density (mA/cm$^2$) increases, high current densities are often desirable to reduce electrochemical stack size/cost required to achieve a given power rating. Active material energy density is directly proportional to the cell OCV (OCV=open circuit voltage), the concentration of active species, and the number of electrons transferred per mole of active species. High energy densities are desirable to reduce the volume of active materials required for a given quantity of stored energy.

It should be appreciated that, while the various embodiments described herein are described in terms of flow battery systems, the same strategies and design/chemical embodiments may also be employed with stationary (non-flow) electrochemical cells, batteries, or systems, including those where one or both half cells employ stationary electrolytes. Each of these embodiments is considered within the scope of the present invention.

Terms

Throughout this specification, words are to be afforded their normal meaning, as would be understood by those skilled in the relevant art. However, so as to avoid misunderstanding, the meanings of certain terms will be specifically defined or clarified.

The term "active material" is well known to those skilled in the art of electrochemistry and electrochemical energy storage and is meant to refer to materials which undergo a change in oxidation state during operation of the system. The term is also referred to as "redox active material" and the usage with "active material" herein is equivalent. Active materials may comprise a solid, liquid, or gas and/or solids, liquids, or gasses dissolved in solution. In certain embodiments, active materials comprise molecules and/or supramolecules dissolved in solution. Active materials with a composition of matter described by this invention may be used in energy storage systems in such a way that they are paired with other active materials to form a positive couple and a negative couple wherein said other active materials are described by the present invention or are previously known in the art or a combination thereof, inclusive of soluble, semi-solid, intercalation, capacitive or pseudo-capacitive, and plating-type active materials. The concentration of the molecules may be at least 2 M, between 1 and 2 M, about 1.5 M, between 0.5 M and 1M, or less than 0.5 M. Separate embodiments provide upper concentrations of about 5 M, about 4 M, about 3 M, about 2.5 M, or about 2 M.

In certain embodiments, the active material may comprise a "metal ligand coordination compound," which are known to those skilled in the art of electrochemistry and inorganic chemistry. A metal ligand coordination compound may comprise a metal ion bonded to an atom or molecule. The bonded atom or molecule is referred to as a "ligand". In certain non-limiting embodiments, the ligand may comprise a molecule comprising C, H, N, and/or O atoms. The ligand may comprise an organic molecule. The metal ligand coordination compounds of the present disclosure are understood to comprise at least one ligand that is not water, hydroxide, or a halide (F$^-$, Cl$^-$, Br$^-$, I$^-$). Where presented here as being represented by "M(L1)$_x$(L2)$_y$(L3)$_z$$^m$", x, y, and z are independently 0, 1, 2, or 3, such that 1≤x+y+z≤3" it should be appreciated that this reflects independent embodiments where "M" contains 1, 2, or 3 ligands of L1, L2, and L3 within its inner coordination sphere, where L1, L2, and L3 are different from one another.

Metal ligand coordination compounds may comprise a "redox active metal ion" and/or a "redox inert metal ion". The term "redox active metal ion" is intended to connote that the metal undergoes a change in oxidation state under the conditions of use. As used herein, the term "redox inert" metal ion is intended to connote that the metal does not undergo a change in oxidation state under the conditions of use. Metal ions may comprise non-zero valence salts of, e.g., Al, Ca, Co, Cr, Sr, Cu, Fe, Mg, Mn, Mo, Ni, Pd, Pt, Ru, Sn, Ti, Zn, Zr, V, or a combination thereof. The skilled artisan would be able to recognize the circumstances where a given non-zero valence metal would be redox active or inactive under the prescribed electrolyte environments. In specific embodiments, the first, second, or both first and second redox active material comprises a metal ligand coordination complex having a formula comprising M(L1)$_x$(L2)$_y$(L3)$_z$$^m$, M is Al, Ca, Ce, Co, Cr, Fe, Mg, Mn, Mo, S, Sn, Ti, W, Zn, or Zr;

L1, L2, and L3 are each independently ascorbate, a catecholate, citrate, a glycolate or polyol (including ligands derived from ethylene glycol, propylene glycol, or glycerol), gluconate, glycinate, α-hydroxyalkanoate (e.g., α-hydroxyacetate, or from glycolic acid), β-hydroxyalkanoate, γ-hydroxyalkanoate, malate, maleate, a phthalate, a pyrogallate, sarcosinate, salicylate, or lactate;

x, y, and z are independently 0, 1, 2, or 3, and 1≤x+y+z≤3; and m is +1, 0, −1, −2, −3, −4, or −5. Related and independent embodiments provide that (a) x=3, y=z=0; (b) x=2, y=1, z=0; (c) x=1, y=1, z=1; (d) x=2, y=1, z=0; (e) x=2, y=z=0; or (f) x=1, y=z=0. In individual preferred embodiments, M is Al, Cr, Fe, or Ti and x+y+z=3.

In other specific embodiments, the first, second, or both first and second redox active material comprise a hexacyanide metal ligand coordination complex, for example comprising chromium, iron, manganese, molybdenum, or ruthenium, preferably a chromium, iron, or manganese hexacyanide, such as ferricyanide or ferrocyanide.

In other embodiments, the active material may comprise an "organic active material". An organic active material may comprise a molecule or supramolecule that does not contain a transition metal ion. It is further understood that organic active materials are meant to comprise molecules or supramolecules that are dissolved in aqueous solution. And organic active material is capable of undergoing a change in oxidation state during operation of the electrochemical energy storage system. In this case, the molecule or supramolecule may accept or donate an electron during operation of the system.

Unless otherwise specified, the term "aqueous" refers to a solvent system comprising at least about 98% by weight of water, relative to total weight of the solvent. In some applications, soluble, miscible, or partially miscible (emulsified with surfactants or otherwise) co-solvents may also be usefully present which, for example, extend the range of water's liquidity (e.g., alcohols/glycols). When specified, additional independent embodiments include those where the "aqueous" solvent system comprises at least about 55%, at least about 60 wt %, at least about 70 wt %, at least about 75 wt %, at least about 80%, at least about 85 wt %, at least about 90 wt %, at least about 95 wt %, or at least about 98 wt % water, relative to the total solvent. It some situations, the aqueous solvent may consist essentially of water, and be substantially free or entirely free of co-solvents or other species. The solvent system may be at least about 90 wt %, at least about 95 wt %, or at least about 98 wt % water, and, in some embodiments, be free of co-solvents or other species.

In addition to the redox active materials described below, the aqueous electrolytes may contain additional buffering agents, supporting electrolytes, viscosity modifiers, wetting agents, and the like.

The term "bipolar plate" refers to an electrically conductive, substantially nonporous material that may serve to separate electrochemical cells in a cell stack such that the cells are connected in series and the cell voltage is additive across the cell stack. The bipolar plate has two surfaces such that one surface of the bipolar plate serves as a substrate for the positive electrode in one cell and the negative electrode in an adjacent cell. The bipolar plate typically comprises carbon and carbon containing composite materials.

The term "cell potential" is readily understood by those skilled in the art of electrochemistry and is defined to be the voltage of the electrochemical cell during operation. The cell potential may be further defined by Equation 1:

$$\text{Cell Potential} = \text{OCV} - \eta_{pos} - \eta_{neg} - iR \tag{1}$$

where OCV is the "open circuit potential", $\eta_{pos}$ and $\eta_{neg}$ are the overpotentials for the positive and negative electrodes at a given current density, respectively, and iR is the voltage loss associated with all cell resistances combined. The "open circuit potential" or OCV may be readily understood according to Equation 2:

$$\text{OCV} = E^+ - E^- \tag{2}$$

where $E^+$ and $E^-$ are the "half-cell potentials" for the redox reactions taking place at the positive and negative electrodes, respectively. The half-cell potentials may be further described by the well-known Nernst Equation 3:

$$E = E^\circ - RT/nF \ln(X_{red}/X_{ox}) \tag{3}$$

wherein $E^\circ$ is the standard reduction potential for redox couple of interest (e.g., either the positive or negative electrode), the R is the universal gas constant, T is temperature, n is the number of electrons transferred in the redox couple of interest, F is Faraday's constant, and $X_{red}/X_{ox}$ is the ratio of reduced to oxidized species at the electrode.

The OCV of a battery system may be measured by using standard techniques when the current flow between the first and second electrode is equal to zero. In this condition the voltage difference between the first and second electrodes corresponds to the OCV. The OCV of a battery system depends on the state of charge (SOC) of said system. Without being bound to the correctness of any theory, the OCV of an ideal battery will change with state of charge according to the Nernst equation (equation 3 above). For simplicity in this application all OCVs will be referenced to their values at 50% SOC. Those of ordinary skill in the art will recognize that at higher SOCs the OCV of a battery will increase, and at lower SOCs the OCV will decrease from the value at 50% SOC.

The term "current density" is well known to those of ordinary skill in the art of electrochemistry and refers to the total current passed in an electrochemical cell divided by the geometric area of the electrodes of the cell and is commonly reported in units of $mA/cm^2$. In certain embodiments of the present invention, current densities may be in a range of from about 50 $mA/cm^2$, from about 100 $mA/cm^2$ or from about 200 $mA/cm^2$, to about 200 $mA/cm^2$, to about 300 $mA/cm^2$, to about 400 $mA/cm^2$, or to about 500 $mA/cm^2$, and these ranges may also apply to those embodiments referred to as providing "at least 100 $mA/cm^2$."

The term "current efficiency" ($I_{EFF}$) may be described as the ratio of the total charge produced upon discharge of the system to the total charge passed upon charge. In some embodiments, the charge produced on discharge or passed on charge can be measured using standard electrochemical coulomb counting techniques well known to those of ordinary skill in the art. Without being bound by the limits of any theory, the current efficiency may be a function of the state of charge of the flow battery. In some non-limiting embodiments the current efficiency can be evaluated over an SOC range of about 35% to about 60%.

The term "energy density" refers to the amount of energy that may be stored, per unit volume, in the active materials. Energy density, as used herein, refers to the theoretical energy density of energy storage and may be calculated by Equation 4:

$$\text{Energy density} = (26.8 \text{ A-h/mol}) \times \text{OCV} \times [e^-] \tag{4}$$

where OCV is the open circuit potential at 50% state of charge, as defined above, (26.8 A-h/mol) is Faraday's constant, and $[e^-]$ is the concentration of electrons stored in the active material at 99% state of charge. In the case that the active materials largely comprise an atomic or molecular species for both the positive and negative electrolyte, $[e^-]$ may be calculated as:

$$[e^-] = [\text{active materials}] \times n/2 \tag{5}$$

where [active materials] is the concentration (mol/L or M) of the active material in either the negative or positive electrolyte, whichever is lower, and n is the number of electrons transferred per molecule of active material. The related term "charge density" refers to the total amount of charge that each electrolyte may contain. For a given electrolyte:

$$\text{Charge density} = (26.8 \text{ A-h/mol}) \times [\text{active material}] \times n \tag{6}$$

where [active material] and n are as defined above.

The term "energy efficiency" may be described as the ratio of the total energy produced upon discharge of the system to the total energy consumed upon charge. The energy efficiency ($RT_{EFF}$) may be computed by Equation 7:

$$RT_{EFF} = V_{EFF,RT} \times I_{EFF} \tag{7}$$

As used herein, the term "evolution current" describes the portion of the electrical current applied in an energized flow battery configuration which is associated with the evolution (generation) of a particular chemical species. In the current context, then, when a sufficient overpotential vide infra) is applied in a flow battery such that either or both oxygen evolves at the positive electrode or hydrogen evolves at the negative electrode, that portion of the current associated with the evolution of oxygen or hydrogen is the oxygen evolution current or hydrogen evolution current, respectively.

In certain preferred embodiments, there is no current associated with hydrogen evolution, oxygen evolution, or both hydrogen and oxygen evolution. This may occur when the positive half-cell is operating at a potential less than the thermodynamic threshold potential or the threshold overpotential of the positive electrode (i.e., no oxygen produced; see explanation of terms below) or the negative half-cell cell is operating at a potential more positive than the thermodynamic threshold potential or the threshold overpotential of the negative electrode (i.e., no hydrogen produced), or both. In separate embodiments, the batteries operates within 0.3 V, within 0.25 V, within 0.2 V, within 0.15 V, or within 0.1 V of either the thermodynamic threshold potential or the threshold overpotential of the respective positive or negative electrodes.

The term "essentially zero hydrogen evolution current" means that less than 1% of the current passed during battery charge or discharge results in the evolution of hydrogen. Similarly, the terms "substantially zero oxygen evolution current" and "carbon corrosion current" means that less than 1% of the current passed during battery charge or discharge results in the evolution of oxygen or the corrosion of carbon respectively.

In embodiments wherein gas is evolved, the portion of current associated with gas evolution (either hydrogen or oxygen or both) is suitably less than about 20%, less than about 15%, less than about 10%, less than about 5%, less than about 2%, or less than about 1% of the total applied current. Lower gas evolution currents are considered particularly suitable for battery (cell or cell stack) efficiencies.

The term "excluding" refers to the ability of a separator to not allow certain ions or molecules to flow through the separator and typically is measured as a percent.

The term "mobile ion" is understood by those skilled in the art of electrochemistry and is meant to comprise the ion which is transferred between the negative and positive electrode during operation of the electrochemical energy storage system. The term "mobile ion" may also refer to as an ion that carries at least 80% of the ionic current during charger/discharge.

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to the reversible hydrogen electrode. The negative electrode is associated with the first aqueous electrolyte and the positive electrode is associated with the second electrolyte, as described herein.

Certain electrodes are referred to as "carbon electrodes". Such electrodes are well known in the art and include graphitic carbon, glassy carbon, amorphous carbon, carbon doped with boron or nitrogen, diamond-like carbon, carbon onion, carbon nanotubes, carbon felt and graphene. When carbon electrodes are used one or both half-cells of the flow battery may contain a carbon electrode. In some embodiments an electrode may be produced by combining high surface area particulate carbon black materials with a binder to produce a composite structure. These materials may include, by way of non-limiting examples, carbon blacks such as Vulcan carbon, Ketjen carbon, acetylene black or Mogul L carbon and binders including NAFION™, phenolic resins, or other suitable polymeric materials. In this application a carbon electrode is to be taken as its normal meaning, that is an electrode comprising carbon or a carbon composite that is substantially metal-free (sometimes referred to as "substantially devoid of metal"). In some embodiments, at least 99% by weight of the carbon electrode is non-metallic.

The term "overpotential" is defined by the difference in voltage between an electrode during operation of an electrochemical cell and the normal half-cell potential of that electrode, as defined by the Nernst equation. Without being bound by theory, the term overpotential is meant to describe the energy, in excess of that required by thermodynamics, to carry out a reaction at a given rate or current density. The term "overpotential" also describes a potential more positive than the thermodynamic onset voltage for oxygen evolution from water at the positive electrode and more negative than the thermodynamic onset voltage for hydrogen evolution from water at the negative electrode.

Similarly, as used herein, the term "threshold overpotential" refers to the overpotential at which either hydrogen or oxygen gas begins to evolve at the respective electrode. Note that an electrochemical system comprising "imperfect" (i.e., less than ideal catalytically) electrodes can be operated in three regions: (a) at a potential "below" the thermodynamic onset potential (i.e., more positive than the thermodynamic onset potential of the negative electrode and more negative than the thermodynamic onset potential of the positive electrode; no gas evolving so no gas evolution current); (b) at a potential between the thermodynamic threshold potential and threshold overpotential (no gas evolving and still no evolution current); and (c) beyond the threshold overpotential (gas evolving and exhibiting a gas evolution current). Such threshold overpotentials can be identified by those skilled in the art for a given system, for example, by measuring gas evolution as a function of applied half-cell potential (using e.g., a mass spectrometer), in the presence or absence of an electroactive material. See also below.

The gas evolution threshold potentials are also affected by the nature of the electrolytes. Certain chemicals are known to inhibit the evolution of hydrogen and oxygen in electrolytic cells, either because of some activity in the bulk electrolyte or because of their ability to coat or otherwise deactivate their respective electrodes; for example, macromolecules or oligomers or salts, such as chloride or phosphate, on Pt surfaces. Accordingly, in certain embodiments, then, either the first or second or both first and second electrolytes comprise at least one compound increases the hydrogen or oxygen threshold overpotential of the system, respectively.

In some embodiments, the active materials may not plate on the electrodes during battery charge or discharge reactions. In this context the term "plate" refers to the propensity for a soluble material to adhere, bond, or precipitate on a stationary surface. In this way, redox active materials that do not plate on the electrodes remain appreciably soluble in the electrolyte over charge and discharge of the battery system.

As used herein, the terms "regenerative fuel cell" or "reversible fuel cell" or "flow battery" or "flow energy device" connote the same or similar type of device, which utilizes the same battery configuration (including cell or cell stack) for both energy storage and energy generation.

The term "reversible hydrogen electrode," or RHE, is used in its conventional meaning. That is, a reversible hydrogen electrode (RHE) is a reference electrode. The potential of the RHE, E(RHE) corresponds to the potential for Equation 8:

$$2H^+ + 2e^- \leftrightarrow H_2 \qquad (8)$$

When the reaction of Equation 8 is carried out at equilibrium at a given pH and 1 atm $H_2$. This potential can be reference to a normal hydrogen electrode, E(NHE), by the following relation:

$$E(RHE) = E(NHE) - 0.059 \times pH = 0.0 \text{ V} - 0.059 \times pH \qquad (9)$$

where E(NHE) is the potential for the normal hydrogen electrode (NHE=0.0 V), defined as the potential for the reaction of Equation 8 at standard state (1M $H^+$, 1 atm $H_2$). Thus a potential of 0 V vs. RHE corresponds to a voltage of 0 V vs. NHE at pH 0 and −0.413 V vs. NHE at pH 7.

The term "selectivity" is well known to those of ordinary skill in the art of electrochemistry and refers to the ability of a membrane to allow a ratio of the movement of mobile ions to active materials through a membrane. For example, a membrane that allows a 50:1 ratio of mobile ions to active materials to pass through would have a selectivity of 50.

The terms "separator" and "membrane" refer to an ionically conductive, electrically insulating material disposed between the positive and negative electrode of an electrochemical cell.

The polymer electrolytes useful in the present disclosure may be anion or cation conducting electrolytes. Where described as an "ionomer," the term refers to a polymer comprising both electrically neutral and a fraction of ionized repeating units, wherein the ionized units are pendant and covalently bonded to the polymer backbone. The fraction of ionized units may range from about 1 mole percent to about 90 mole percent, but may be further categorized according to their ionized unit content. For example, in certain cases, the content of ionized units are less than about 15 mole percent; in other cases, the ionic content is higher, typically greater than about 80 mole percent. In still other cases, the ionic content is defined by an intermediate range, for example in a range of about 15 to about 80 mole percent. Ionized ionomer units may comprise anionic functional groups comprising carboxylates, sulfonates, phosphonates, salts of a carboxy acid, sulfonic acid, phosphonic acid, and the like. These functional groups can be charge balanced by, mono-, di-, or higher-valent cations, such as alkali or alkaline earth metals. Ionomers may also include polymer compositions containing attached or embedded quaternary ammonium, sulfonium, phosphazenium, and guanidinium residues or salts. The polymers useful in the present disclosure may comprise highly fluorinated or perfluorinated polymer backbones. Certain polymer electrolytes useful in the present disclosure include copolymers of tetrafluoroethylene and one or more fluorinated, acid-functional co-monomers, which are commercially available as NAFION™ perfluorinated polymer electrolytes from E. I. du Pont de Nemours and Company, Wilmington Del. Other useful perfluorinated electrolytes comprise copolymers of tetrafluoroethylene (TFE) and $FSO_2$—$CF_2CF_2CF_2CF_2$—O—CF=$CF_2$.

The term "stack" or "cell stack" or "electrochemical cell stack" refers to a collection of individual electrochemical cells that are in electrically connected. The cells may be electrically connected in series or in parallel. The cells may or may not be fluidly connected.

The term "state of charge" (SOC) is well understood by those skilled in the art of electrochemistry, energy storage, and batteries. The SOC is determined from the concentration ratio of reduced to oxidized species at an electrode ($X_{red}/X_{ox}$). For example, in the case of an individual half-cell, when $X_{red} = X_{ox}$ such that $X_{red}/X_{ox} = 1$, the half-cell is at 50% SOC, and the half-cell potential equals the standard Nernstian value, $E°$. When the concentration ratio at the electrode surface corresponds to $X_{red}/X_{ox} = 0.25$ or $X_{red}/X_{ox} = 0.75$, the half-cell is at 25% and 75% SOC respectively. The SOC for a full cell depends on the SOCs of the individual half-cells and in certain embodiments the SOC is the same for both positive and negative electrodes. Measurement of the cell potential for a battery at OCV, and using Equations 2 and 3 the ratio of $X_{red}/X_{ox}$ at each electrode can be determined, and therefore the SOC for the battery system.

The reversible flow batteries of the present invention may additionally be defined in terms of their operating characteristics. For example, in certain individual embodiments, using the chemistries described herein, the half-cells exhibit substantially reversible electrochemical kinetics. Unless otherwise specified, the term "substantially reversible electrochemical kinetics" refers to the condition wherein the voltage difference between the anodic and cathodic peaks is less than about 0.3 V, as measured by cyclic voltammetry, using an ex-situ apparatus using a flat glassy carbon disc electrode and recording at 100 mV/s. However, additional embodiments provide that the voltage difference between the anodic and cathodic peaks is less than about 0.2 V, less than about 0.1 V, less than about 0.075 V, or less than about 0.059 V, under these same testing conditions.

The term "supporting electrolyte" refers to any species which is redox inactive in the window of electric potential of interest and aids in supporting charge and ionic conductivity. In the present case, a supporting electrolyte does not substantially compromise the solubility of the coordination compound or complex. Non-limiting examples include salts comprising an alkali metal, ammonium ion including an ammonium ion partially or wholly substituted by alkyl or aryl groups, halide (e.g., $Cl^-$, $Br^-$, $I^-$), chalcogenide, phosphate, hydrogen phosphate, phosphonate, nitrate, sulfate, nitrite, sulfite, perchlorate, tetrafluoroborate, hexafluorophosphate, or a mixture thereof, and others known in the art.

The term "voltage efficiency" may be described as the ratio of the observed electrode potential, at a given current density, to the half-cell potential for that electrode (×100%), wherein the half-cell potential is calculated as described above. Voltage efficiencies can be described for a battery charging step, a discharging step, or a "round trip voltage efficiency". The round trip voltage efficiency ($V_{EFF,RT}$) at a given current density can be calculated from the cell voltage at discharge ($V_{Discharge}$) and the voltage at charge ($V_{charge}$) using Equation 10:

$$V_{EFF,RT} = V_{Discharge}/V_{Charge} \times 100\% \qquad (10)$$

Exemplary Operating Characteristics

The present disclosure provides a variety of technical features of the disclosed systems and methods. It should be understood that any one of these features may be combined with any one or more other features. For example, a user might operate a system featuring an electrolyte that includes an organic active material (e.g., a quinone), wherein that electrode has a pH of about 3. Such a system might also feature a membrane separator having a thickness of about 35 microns. It should be further understood that the present disclosure is not limited to any particular combination or combinations of the following features.

In traditional flow battery operation, mobile ions comprise proton, hydronium, or hydroxide. In various embodiments of the present disclosure, one may transportions other than proton, hydronium, or hydroxide (e.g., when these ions are present in comparatively low concentration, such as below 1M). Separate embodiments of these methods of operating a flow battery include those wherein the mobile ion does not consist essentially of protons, hydronium, or hydroxide. In this embodiment, less than 50% of the mobile ions comprise protons, hydronium, or hydroxide. In other embodiments, less than about 40%, less than about 30%, less than about 20%, less than about 10%, less than about 5%, or less than about 2% of the mobile ions comprise protons, hydronium, or hydroxide. Exemplary mobile ions in these embodiments include alkali metal or alkaline earth metal cations (especially $Li^+$, $Na^+$, $K^+$, $Mg^{2+}$, $Ca^{2+}$ or $Sr^{2+}$).

In some embodiments of the present disclosure, it is advantageous to operate between pH 1 and 13 (e.g. to enable active material solubility and/or low system cost). In this case one or both electrolytes is characterized as having a pH of between about 1 and about 13, or between about 2 and about 12, or between about 4 and about 10, or even between about 6 and about 8. Certain embodiments operate with an electrolyte having a pH between about 8 and about 13. In some of these embodiments, the pH is between about 10 and about 12. Some preferred embodiments operate with an electrolyte having a pH of about 10.5 to 11.5. In some embodiments, the pH of the electrolyte may be maintained by a buffer. Typical buffers include salts of phosphate, borate, carbonate, silicate, trisaminomethane (Tris), 4-(2-hydroxyethyl)-1-piperazineethanesulfonic acid (HEPES), piperazine-N,N'-bis(ethanesulfonic acid) (PIPES), and combinations thereof. A user may add an acid (e.g., HCl, $HNO_3$, $H_2SO_4$ and the like), a base (NaOH, KOH, and the like), or both to adjust the pH of a given electrolyte as desired.

In some embodiments, the pH of the first and second electrolytes are equal or substantially similar; in other embodiments, the pH of the two electrolytes differ by a value in the range of about 0.1 to about 2 pH units, about 1 to about 10 pH units, about 5 to about 12 pH units, about 1 to about 5 pH units, about 0.1 to about 1.5 pH units, about 0.1 to about 1 pH units, or about 0.1 to about 0.5 pH. In this context, the term "substantially similar," without further qualification, is intended to connote that the difference in pH between the two electrolytes is about 1 or less pH unit. Additional optional embodiments provide that the pH difference is about 0.4 or less, about 0.3 or less, about 0.2 or less, or about 0.1 or less pH units.

The disclosed systems and methods may also comprise active materials and membrane ionomers which are charged. The term "charge" in refers to the "net charge" or total charge associated with an active material or ionomer moiety. The charged species may be anionic or cationic. In certain desired embodiments of the present disclosure it is advantageous for the active materials and membrane ionomers to comprise charges of the same sign (e.g. to prevent transfer of the active material across the membrane).

Systems and methods according to the present disclosure also feature active materials comprising metal-ligand coordination compounds. Metal-ligand coordination compounds may be present at, e.g., a concentration of at least about 0.25 M, at least about 0.35 M, at least about 0.5 M, at least about 0.75 M, at least about 1 M, at least about 1.25 M, at least about 1.5 M, at least about 2 M, or at least about 2 M, for example as high as about 3 M, about 4 M, or about 5 M.

The metal-ligand coordination compound may be further characterized with respect to the nature of the oxidizable or reducible species. For example, in some cases, the redox potential of the metal-ligand coordination compound may be defined by transitions entirely within the metal center—i.e., the redox potential is defined by the accessibility of and energies associated with transitions between various valence states within the metal. In other cases, the oxidation/reduction may be localized within the ligand system. In still other cases, the oxidation/reduction may be distributed throughout the entire redox active complex, such that both the metal and the ligand system sharing in the distribution of charge.

In particular embodiments of the present disclosure, the metal-ligand coordination compound may comprise ligands which are mono-, bi-, tri-, or multidentate. Monodentate ligands bind to metals through one atom, whereas bi-, tri-, or multidentate ligands bind to metals through 2, 3, or more atoms, respectively. Examples of monodentate ligands include halogens ($F^-$, $Cl^-$, $Br^-$, $I^-$), cyanide ($CN^-$), carbonyl or carbon monoxide (CO), nitride ($N^{3-}$), oxo ($O^{2-}$), hydroxo ($OH^-$), sulfide ($S^{2-}$), pyridine, pyrazine, and the like. Other types of ligand bonding moieties include amino groups ($NR_3$), amido groups ($NR_2$), imido groups (NR), alkoxy groups (R—$CO^-$), siloxy (R—$SiO^-$), thiolate (R—$S^-$), and the like, which may comprise mono-, bi-, tri-, or multidentate ligands. Examples of bidentate ligands include catechol, bipyridine, bipyrazine, ethylenediamine, diols (including ethylene glycol), and the like. Examples of tridentate ligands include terpyridine, diethylenetriamine, triazacyclononane, trisaminomethane, and the like.

The disclosed systems and methods may feature electrochemical cell separators and/or membranes that have certain characteristics. In this disclosure, the terms membrane and separator are used interchangeably. The membranes of the present disclosure may, in some embodiments, feature a membrane separator having a thickness of about 500 microns or less, about 300 microns or less, about 250 microns or less, about 200 microns or less, about 100 microns or less, about 75 microns or less, about 50 microns or less, about 30 microns or less, about 25 microns or less, about 20 microns or less, about 15 microns or less, or about 10 microns or less, for example to about 5 microns.

Separators are generally categorized as either solid or porous. Solid membranes typically comprise an ion-exchange membrane, wherein an ionomer facilitates mobile ion transport through the body of the polymer. The facility with which ions conduct through the membrane can be characterized by a resistance, typically an area resistance in units of $\Omega$ $cm^2$. The area resistance is a function of inherent membrane conductivity and the membrane thickness. Thin membranes are desirable to reduce inefficiencies incurred by ion conduction and therefore can serve to increase voltage efficiency of the energy storage device. Active material crossover rates are also a function of membrane thickness, and typically decrease with increasing membrane thickness. Crossover represents a current efficiency loss that must be balanced with the voltage efficiency gains by utilizing a thin membrane.

Porous membranes are non-conductive membranes which allow charge transfer between two electrodes via open channels filled with conductive electrolyte. Porous membranes are permeable to liquid or gaseous chemicals. This permeability increases the probability of chemicals passing through porous membrane from one electrode to another causing cross-contamination and/or reduction in cell energy efficiency. The degree of this cross-contamination depends on, among other features, the size (the effective diameter and channel length), and character (hydrophobicity/hydrophilicity) of the pores, the nature of the electrolyte, and the degree of wetting between the pores and the electrolyte.

Such ion-exchange separators may also comprise membranes, which are sometimes referred to as polymer electrolyte membrane (PEM) or ion conductive membrane (ICM). The membranes according to the present disclosure may comprise any suitable polymer, typically an ion exchange resin, for example comprising a polymeric anion or cation exchange membrane, or combination thereof. The mobile phase of such a membrane may comprise, and/or is responsible for the primary or preferential transport (during operation of the battery) of at least one mono-, di-, tri-, or higher valent cation and/or mono-, di-, tri-, or higher valent anion, other than protons or hydroxide ions.

Additionally, substantially non-fluorinated membranes that are modified with sulfonic acid groups (or cation exchanged sulfonate groups) may also be used. Such membranes include those with substantially aromatic backbones, e.g., poly-styrene, polyphenylene, bi-phenyl sulfone (BPSH), or thermoplastics such as polyetherketones or polyethersulfones. Examples of ion-exchange membranes include NAFION™.

Battery-separator style porous membranes, may also be used. Because they contain no inherent ionic conduction capability, such membranes are typically impregnated with additives in order to function. These membranes are typically comprised of a mixture of a polymer, and inorganic filler, and open porosity. Suitable polymers include those chemically compatible with the electrolytes of the presently described systems, including high density polyethylene, polypropylene, polyvinylidene difluoride (PVDF), or polytetrafluoroethylene (PTFE). Suitable inorganic fillers include silicon carbide matrix material, titanium dioxide, silicon dioxide, zinc phosphide, and ceria and the structures may be supported internally with a substantially non-ionomeric structure, including mesh structures such as are known for this purpose in the art.

The open circuit potential (OCV) of an electrochemical cell is a relevant operating characteristic of electrochemical energy storage systems. In certain embodiments, the OCV may be comparatively large (e.g. greater than about 1 V, and upwards of about 2 V, about 3 V, or about 4 V). Such comparatively large open circuit potentials are known to enable high cell voltage efficiencies, high DC-DC conversion efficiencies, high energy storage densities, and low system costs. Traditional flow batteries with aqueous electrolytes and soluble active materials may operate with an OCV less than about 1.2 V. An electrochemical cell according to the present disclosure is suitably characterized by an open circuit potential of at least about 1.4 V.

In some embodiments, the open circuit voltage (OCV) of the flow battery is at least about 1.2 volts, at least about 1.3 V, at least about 1.4 V, at least about 1.5 V, at least about 1.6 V, at least about 1.7 V, at least about 1.8 V, at least about 1.9 V, or at least about 2 V, for example to about 3 V, about 4 V, or about 5 V. In some preferred embodiments the OCV may be 1.6 to 1.7 V, and in some cases may be 1.63 V or 1.68 V. As described above, higher open circuit voltages are associated with higher power densities.

Systems and methods according to the present disclosure may exhibit a particular current density at a given round trip voltage efficiency. Methods for determining current density at a given round trip voltage efficiency are known to those skilled in the art of electrochemistry and electrochemical energy storage.

To serve as a metric for electrochemical cell performance, a specified current density must be linked to a measured voltage efficiency. Higher current densities for a given round trip voltage efficiency enable lower cost electrochemical cells and cell stacks. In certain embodiments, it is desired to operate a flow battery with a current density of at least about 50 mA/cm$^2$ at $V_{EFF,RT}$ of at least about 50%. In other embodiments, the current density will be at least about 50 mA/cm$^2$ at $V_{EFF,RT}$ at least about 60%, at least about 75%, at least about 85%, at least about 90%. In other embodiments, the current density will be at least 100 mA/cm$^2$ at $V_{EFF,RT}$ of at least about 50%, at least about 60%, at least about 75%, at least about 85%, at least about 90% and the like. In other embodiments, the current density is at least 200 mA/cm$^2$ at $V_{EFF,RT}$ at least about 50%, at least about 60%, at least about 75%, at least about 85%, at least about 90%, and above. In certain embodiments, these efficiencies may be achieved when the current density is in a range of having a lower limit of about 50 mA/cm$^2$, from about 100 mA/cm$^2$ or from about 200 mA/cm$^2$ and having an upper limit of about 200 mA/cm$^2$, to about 300 mA/cm$^2$, to about 400 mA/cm$^2$, or to about 500 mA/cm$^2$.

Electrolytes that include an organic active material, either in the absence or presence of metal coordination, are considered suitable for one or both half-cells of the disclosed systems and methods. Suitable organic active materials include carbon, aromatic hydrocarbons, including quinones, hydroquinones, viologens, pyridinium, pyridine, acridinium, catechol, other polycyclic aromatic hydrocarbons, and the like. Suitable organic active materials may also include sulfur, including thiol, sulfide, and disulfide moieties. Suitable organic active materials may be soluble in water in concentrations of at least 0.1M, at least 0.5M, at least 1M, at least 1.5M, greater than 2M, and above.

The disclosed systems and methods may also be characterized in terms of their half-cell potentials. Both the negative and positive electrode may exhibit a half-cell potential. An electrochemical cell according to the present disclosure may, in some embodiments, have a half-cell potential for the negative electrode less than about 0.5 V vs. RHE, less than about 0.2 V vs. RHE, less than about 0.1 V vs. RHE, less than about 0.0 V vs. RHE, less than about −0.1 V vs. RHE, less than about −0.2 V vs. RHE, less than about −0.3 V vs. RHE, less than about −0.5 V vs. RHE, for example, to about −2 V vs. RHE. An electrochemical cell according to the present disclosure may, in some embodiments, have a half-cell potential for the positive electrode greater than about 0.5 V vs. RHE, greater than about 0.7 V vs. RHE, greater than about 0.85 V vs. RHE, greater than about 1.0V vs. RHE, greater than about 1.1V vs. RHE, greater than about 1.2V vs. RHE, greater than about 1.3 V vs. RHE, greater than about 1.4 V vs. RHE and the like, for example, to about 2 V vs. RHE.

The disclosed systems and methods may also be characterized in terms of their energy density, as defined above. Flow batteries of the present disclosure may operate with an energy density of about 5 Wh/L, between about 5 Wh/L and about 15 Wh/L, between about 10 Wh/L and about 20 Wh/L, between about 20 Wh/L and about 30 Wh/L, between about 30 and about 40 Wh/L, between about 25 Wh/L and about 45 Wh/L, and above 45 Wh/L, for example to about 70 Wh/L, about 60 Wh/L, about 50 Wh/L, or about 40 Wh/L. In certain embodiments, the energy density is at least about 30 Wh/L, or about 30 to about 45 Wh/L, or about 35 to 45 Wh/L.

Among the many embodiments considered within the scope of the present invention are these:

Embodiment 1

A flow battery comprising:
a first aqueous electrolyte comprising a first redox active material;
a second aqueous electrolyte comprising a second redox active material;
a first electrode in contact with said first aqueous electrolyte;
a second electrode in contact with said second aqueous electrolyte and
a separator disposed between said first aqueous electrolyte and said second aqueous electrolyte;
said flow battery having an open circuit potential of at least about 1.4 V, and which are capable of operating or are operating at a current density of at least 50 mA/cm$^2$; and wherein both of the first and second redox active materials remain soluble in both the charged and discharged state.

Embodiment 2

The flow battery of Embodiment 1, wherein at least one of said first electrode and said second electrode is a carbon electrode.

Embodiment 3

The flow battery of Embodiment 1 or 2, wherein the battery is adapted such that said carbon electrodes remain substantially metal-free during operation of said flow battery.

Embodiment 4

The flow battery of any one of the preceding Embodiments, wherein at least one of said redox active materials is an organic compound substantially devoid of metal.

Embodiment 5

The flow battery of any one of Embodiments 1 to 4, wherein said redox active material comprises an aromatic compound.

Embodiment 6

The flow battery of any one of Embodiments 1 to 3, wherein at least one of said redox active materials is a metal ligand coordination compound.

Embodiment 7

The flow battery of any one of Embodiments 1 to 6 having an energy density of at least 30 watt hour/liter (Wh/L).

Embodiment 8

The flow battery of any one of Embodiments 1 to 7, wherein at least one of said first electrolyte or said second electrolyte is an aqueous electrolyte having a pH in a range of from about 8 to about 13.

Embodiment 9

The flow battery of Embodiment 8, wherein the pH is in a range of from about 10 to about 12.

Embodiment 10

The flow battery of any one of Embodiments 1 to 6, wherein the pH is in a range of from about 10.5 to about 11.5.

Embodiment 11

The flow battery of any one of Embodiments 1 to 10, that is capable of operating with a voltage efficiency of at least about 70%.

Embodiment 12

The flow battery of any one of Embodiments 1 to 11, wherein said separator comprises an ionomer.

Embodiment 13

The flow battery of any of the preceding Embodiments, further comprising a second-electrolyte tank fluidicly connected to the second chamber to transfer a fluid and a first-electrolyte tank fluidicly connected to the first chamber to transfer another fluid.

Embodiment 14

The flow battery of any of the preceding Embodiments, further comprising a pump of transporting a fluid between the second-electrolyte tank and the second chamber, or between the first-electrolyte tank and the first chamber, or both.

Embodiment 15

A method of operating a flow battery of any of the preceding Embodiments, said method comprising charging said battery by the input of electrical energy or discharging said battery by the removal of electrical energy.

Embodiment 16

A method of operating a flow battery of any one of Embodiments 1 to 12, said method comprising applying a potential difference across the first and second electrode, with an associated flow of electrons, so as to:
(a) reduce the first redox active material while oxidizing the second redox active material; or
(b) oxidize the first redox active material while reducing the second redox active material.

Embodiment 17

A method of charging a flow battery of any one of Embodiments 1 to 12, with an associated flow of electrons, said method comprising applying a potential difference across the negative and positive electrode, so as to:
(a) reduce the first redox active material; or
(b) oxidize the second redox active material; or
(c) or both (a) and (b).

Embodiment 18

A method of discharging the flow battery of any one of Embodiments 1 to 12, with an associated flow of electrons, said method comprising applying a electrical load across the negative and positive electrode so as to:

(a) oxidize the first redox active material; or
(b) reduce the second redox active material; or
(c) or both (a) and (b).

Embodiment 19

A system comprising a flow battery of any one of Embodiments 1 to 12, and further comprising:
(a) a first chamber containing the first aqueous electrolyte and a second chamber containing the second aqueous electrolyte;
(b) at least one electrolyte circulation loop in fluidic communication each electrolyte chamber, said at least one electrolyte circulation loop comprising storage tanks and piping for containing and transporting the electrolytes;
(c) control hardware and software; and
(d) a power conditioning unit.

Embodiment 20

The system of Embodiment 19, the system connected to an electrical grid configured to provide renewables integration, peak load shifting, grid firming, baseload power generation/consumption, energy arbitrage, transmission and distribution asset deferral, weak grid support, frequency regulation, or a combination thereof.

Embodiment 21

The system of Embodiment 19, the system configured to provide stable power for remote camps, forward operating bases, off-grid telecommunications, or remote sensors.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

Example 1

Example 1.1—Materials

Sodium hexacyanoferrate(II) decahydrate 99%, $Na_4Fe(CN)_6 \cdot 10H_2O$; potassium hexacyanoferrate(II) trihydrate 98+%, $K_4Fe(CN)_6 \cdot 3H_2O$; potassium hexacyanoferrate(III) ACS 99.0% min; $K_3Fe(CN)_6$; ethylene glycol, propylene glycol, glycerol, lactic acid (80-85% aqueous solution); glycine, glycolic acid (67% aqueous solution); maleic acid; malic acid; phthalic acid; salicylic acid; gluconic acid; citric acid; sarcosine; iron (III) sulfate; iron (III) chloride; titanium oxysulfate; manganese (II) sulfate; and chromium (III) sulfate were purchased from Alfa Aesar (Ward Hill, Mass.) as ACS grade or better unless specified above and were used without additional purification. Ammonium bislactatobishydroxytitanium (IV) was purchased from Sigma Aldrich (St. Louis, Mo.) as a 50% aq. solution and was used without further purification. Potassium hexacyanochromate(III), $K_3[Cr(CN)_6]$ and potassium hexacyanomanganate(III), $K_3[Mn(CN)_6]$ were purchased from Sigma-Aldrich (St. Louis, Mo.) and used without additional purification.

Complexes could be synthesized by several methods. Homoleptic tris-ligated complexes were most easily synthesized by stirring a 3:1 aqueous mixture of ligand and metal salt while slowly adding an alkali metal hydroxide solution until the pH was between 8 and 13, the typical window of stability for the complexes of interest. Certain mixed ligand species, for example $Ti(lactate)_2(salicylate)$, could also be synthesized by this method.

Mono and bis α-hydroxy acid complexes of iron and titanium were synthesized by the portion-wise addition of 2 equivalents of sodium bicarbonate to stirred solutions of the metal sulfates (2-3 M) and the appropriate proportion of the appropriate ligand. For example, 6 mmol of $TiOSO_4$ and 6 mmol of glycolic acid were stirred, and 12 mmol of $NaHCO_3$ was added slowly, allowing gas evolution to subside between additions. The pH of the resulting solutions was about 3.5 for the solutions of $ML_1$ and about 2 for the solutions of $ML_2$. The solubility of these complexes relative to aquated metals is evidenced by the stability with respect to precipitation of metal oxides of $TiL_1$ and $TiL_2$ solutions at such high pHs. In a control experiment where no ligand was added, wholesale and irreversible precipitation of $TiO_2$ was observed when more than 1 equivalent of $NaHCO_3$ was added, corresponding to a pH of about 1.

Complexes with additional ligands could be synthesized by adding an appropriate amount of $ML_1$ or $ML_2$ solution synthesized as described in the previous paragraph to a solution of the desired additional ligand mixed with a suitable base, such as potassium carbonate or potassium hydroxide. Mixed ligand analogs of the Mn, Cr, Ti, and Fe compounds may be prepared by similar reaction schemes.

Titanium bis-lactate L' complexes could also be synthesized using $(NH_4)_2Ti(lactate)_2(OH)_2$ (available from Sigma Aldrich as a 50% solution) as a synthon. In this case, L' (e.g., salicylic acid) was added, and after about an hour of stirring, an aqueous solution of 2 eq. alkali metal hydroxide was added to deprotonate ammonium, drive off ammonia over the course of about 24 hours of stirring uncapped in a fume hood, and provide the desired metal complex as a sodium/potassium salt, e.g., $NaKTi(lactate)_2(salicylate)$.

Disodium titanium(IV) triscatecholate, $Na_2Ti(catecholate)_3$ was synthesized by a modification of a procedure described by Davies, see Davies, J. A.; Dutramez, S. *J. Am. Ceram. Soc.* 1990, 73. 2570-2572, from titanium(IV) oxysulfate and pyrocatechol. Sodium hydroxide was used in place of ammonium hydroxide to obtain the sodium salt. Sodium potassium titanium(IV) trispyrogallate, $NaKTi(pyrogallate)_3$ was made analogously, first as the ammonium salt, $(NH_4)Ti(pyrogallate)_3$, and subsequently converted to the sodium potassium salt by heating in a mixture of aqueous sodium hydroxide and aqueous potassium hydroxide.

The mixed ligand titanium complexes sodium potassium titanium(IV) biscatecholate monopyrogallate, sodium potassium titanium(IV) biscatecholate-monolactate, sodium potassium titanium (IV) biscatecholate monogluconate, sodium potassium titanium(IV) biscatecholate monoascorbate, and sodium potassium titanium(IV) bis catecholate monocitrate were made from a titanium catecholate dimer, $Na_2K_2[TiO(catecholate)]_2$. For the synthesis of the tetrapotassium salt see Borgias, B. A.; Cooper, S. R.; Koh, Y. B.; Raymond, K. N. *Inorg. Chem.* 1984, 23, 1009-1016. A one-to-one mixture of titanium dimer with the desired chelate (pyrogallol, lactic acid, gluconic acid, ascorbic acid, or citric acid) gave the mixed ligand species. Sodium potassium titanium(IV) monocatecholate monopyrogallate monolactate was made in a similar fashion by addition of both pyrogallol and lactic acid to the catecholate containing dimer. Mixed ligand analogs of the Al, Cr, Fe, and Mn compounds may be prepared by similar reaction schemes.

Mixed ligand analogs of the Al, Cr, Fe, and Mn compounds may be prepared by similar reaction schemes.

Sodium potassium iron(III) triscatecholate, $Na_{1.5}K_{1.5}Fe$ (catecholate)$_3$ was prepared according to the procedure outline by Raymond et. al., see Raymond, K. N.; Isied, S. S.; Brown, L. D.; Fronczek, F. R.; Nibert, J. H. *J. Am. Chem. Soc.* 1976, 98, 1767-1774. The only modification was the use of a mixture of sodium hydroxide and potassium hydroxide as the excess base in place of potassium hydroxide.

Sodium titanium(IV) triscitrate, $Na_4Ti(citrate)_3$, was synthesized by analogy to the method used for sodium titanium (IV) triscatecholate described above except using citric acid in place of catechol. These starting materials were obtained from Alfa Aesar (Ward Hill, Mass.), were of reagent grade or better, and were used as received.

Sodium aluminum(III) biscitrate monocatecholate, Al(citrate)$_2$(catecholate), was synthesized in analogy to the method used for sodium titanium(IV) triscatecholate described above except using two equivalents of citric acid and one equivalent of catechol to a solution of aluminum (III) sulfate. These starting materials were obtained from Alfa Aesar (Ward Hill, Mass.), were of reagent grade or better, and were used as received.

Example 1.2—Experimental Procedure for Preparation of a 5 cm$^2$ Active Area Flow Battery Cell hardware designed for 5 cm$^2$ active area and modified for acid flow was obtained from Fuel Cell Technologies (Albuquerque, N. Mex.). Carbon felt, nominally 3 mm thick, was obtained from Alfa Aesar (Ward Hill, Mass.) and MGL 370 carbon paper was obtained from Fuel Cell Earth (Stoneham, Mass.). Felts were dip-coated with a suspension of Vulcan XC-72 carbon (Cabot Corp., Boston, Mass.) and NAFION™ (Ion-Power, New Castle, Del.) and air-dried before use and carbon papers were used as received. NAFION™ HP, XL, or NR-212 cation exchange membranes were obtained from Ion-Power in the H$^+$ form and were used as received. VITON™ gaskets were obtained from McMaster Carr (Robinsville, N.J.) and were cut to allow for a 5 cm$^2$ active area with ~1 cm$^2$ areas left above and below the felts for electrolyte ingress and egress from the positive and negative compartments of the cell. The cell was assembled using gaskets that provided a compression of ~25% of the measured thickness of the felts or papers. The membranes and electrodes were not pretreated before assembly. The electrolyte reservoirs were fashioned from Schedule 80 PVC piping with PVDF tubing and compression fittings. Masterflex™ L/S peristaltic pumps (Cole Parmer, Vernon Hills, Ill.) were used with Tygon™ tubing. Electrolytes were sparged with UHP argon through an oil-filled bubbler outlet before electrochemical testing. An Arbin Instruments BT2000 (College Station, Tex.) was used to test the electrochemical performance, and a Hioki 3561 Battery HiTESTER (Cranbury, N.J.) was used to measure the AC resistance across the cell.

In a typical experiment, 50 mL each of electrolyte containing active material for the positive and negative electrode were loaded into separate reservoirs and sparged with argon for 20 minutes while circulating the electrolytes through the cell. The electrolytes were charged to 40% SOC (calculated from the concentrations of the active materials and the volumes of the electrolyte), the iV response of the cell was obtained, and then the electrolytes were cycled between 40 and 60% SOC. Once the cell had been charged to 50% SOC the current was brought to 0 A and the cell OCV was measured. An analog output from the Hioki battery tester was recorded to monitor changes in the membrane and contact resistances.

Example 2—Method for Experimental Measurement of a Flow Battery Half-Cell Potential The half-cell potential of redox active energy storage materials were measured by standard three-electrode electrochemical techniques well known to one of ordinary skill in the art. In brief, a sample of the redox active material of interest was dissolved in a solution of the supporting electrolyte of interest at the appropriate pH with an active material concentration in the range of 1 mM to 3 M. The solution was deoxygenated by sparging with argon for at least 20 minutes, and three electrodes were placed in contact with the solution. A typical experiment included using a polished glassy carbon disk working electrode (e.g., a 3.0 mm diameter disk), an Ag/AgCl reference electrode, and a platinum wire or gauze counter electrode. Such electrodes may be fabricated or obtained from a supplier such as Bioanalytical Systems Inc, West Lafayette, N. The electrodes were cleaned, polished, and tested according to the manufacturer's instructions before use. The three electrodes were connected to a potentiostat (e.g., 760c, BASi, West Lafayette, Ind.), and cyclic voltammograms were obtained in the voltage region of interest at scan rates varying from 5 mV/s to 500 mV/s. If the couple was substantially chemically reversible and thus showed well-defined forward and reverse peaks, the half-cell potential was approximated by the half-wave potential from the voltammograms. The average potential of the forward and reverse peaks provided the $E_{1/2}$ for the couple, also described as the half-cell potential.

TABLE 1

Exemplary electrochemical couples described herein

| Couple | $E_{1/2}$, V vs. RHE | pH | FIG. | Solubility (Molar), 25° C. | Charge Density (Ah/L) |
|---|---|---|---|---|---|
| Fe(catecholate)$_3^{2-/3-}$ | −0.50 | 11 | 2 | 1.5 | 40.2 |
| Ti(catecholate)$_3^{2-/3-}$ | −0.45 | 11 | 3 | 1.0 | 26.8 |
| Ti(pyrogallate)$_3^{2-/3-}$ | −0.55 | 9.8 | 4 | 1.6 | 42.9 |
| Ti(catecholate)$_2$(pyrogallate)$^{2-/3-}$ | −0.50 | 11 | 5 | 1.5 | 40.2 |
| Ti(catecholate)$_2$(ascorbate)$^{2-/3-}$ | −0.55 | 10 | 6 | 1.5 | 40.2 |
| Ti(catecholate)$_2$(gluconate)$^{2-/3-}$ | −0.60 | 9 | 7 | 1.5 | 40.2 |
| Ti(catecholate)$_2$(lactate)$^{2-/3-}$ | −0.49 | 9 | 8 | 1.5 | 40.2 |
| Ti(catecholate)(pyrogallate)(lactate)$^{2-/3-}$ | −0.70 | 8.5 | 9 | 1.5 | 40.2 |
| Ti$^{IV/III}$(lactate)$_1$ | −0.34 | 3.6 | n/a | 1.75 | 46.9 |
| Ti$^{IV/III}$(lactate)$_1$ | −0.40 | 5.6 | 10 | 1.75 | 46.9 |

TABLE 1-continued

Exemplary electrochemical couples described herein

| Couple | $E_{1/2}$, V vs. RHE | pH | FIG. | Solubility (Molar), 25° C. | Charge Density (Ah/L) |
|---|---|---|---|---|---|
| $Ti^{IV/III}(lactate)_1$ | −0.54 | 9 | 11 | 1.75 | 46.9 |
| $Ti^{IV/III}(lactate)_2$ | −0.40 | 3.6 | 12 | 1.75 | 46.9 |
| $Ti^{IV/III}(lactate)_2$ | −0.40 | 9 | 13 | 1.75 | 46.9 |
| $Ti^{IV/III}(lactate)_1(malate)_2$ | −0.40 | 9.9 | 14 | 1.5 | 40.2 |
| $Ti^{IV/III}(malate)_2 (salicylate)$ | −0.48 | 10 | 15 | 1.5 | 40.2 |
| $Ti^{IV/III}(lactate)_2 (glycinate)$ | −0.50 | 9.9 | 16 | 1.5 | 40.2 |
| $Ti^{IV/III}(lactate)_2 (salicylate)$ | −0.48 | 10 | 17 | 1.5 | 40.2 |
| $Ti^{IV/III}(salicylate)_2(lactate)$ | −0.50 | 9.8 | 18 | 1.5 | 40.2 |
| $Ti^{IV/III}(\alpha\text{-hydroxyacetate})_2(salicylate)$ | −0.48 | 10 | 19 | 1.5 | 40.2 |
| $Ti^{IV/III}(malate)_2(salicylate)$ | −0.50 | 10 | n/a | 1.5 | 40.2 |
| $Ti^{IV/III}(\alpha\text{-hydroxyacetate})_2(lactate)$ | −0.50 | 10 | 20 | 1.5 | 40.2 |
| $Ti^{IV/III}(lactate)_2(\alpha\text{-hydroxyacetate})$ | −0.50 | 10 | n/a | 1.5 | 40.2 |
| $Ti^{IV/III}(lactate)_3$ | −0.45 | 10 | n/a | 1.75 | 46.9 |
| $Fe^{III/II}(malate)_3$ | −0.30 | 9.2 | 21 | 1.0 | 26.8 |
| $Fe^{III/II}(\alpha\text{-hydroxyacetate})_3$ | −0.50 | 8.1 | 22 | 1.0 | 26.8 |
| $Fe^{III/II}(lactate)_2(salicylate)_1$ | −0.39 | 8.7 | n/a | 1.0 | 26.8 |
| $Cr(CN)_6^{3-/4-}$ | −0.60 | 9 | 23 | 1.5 | 40.2 |
| $Mn(CN)_6^{3-/4-}$ | −0.60 | 9 | 24 | 1.5 | 40.2 |
| $Fe(CN)_6^{3-/4-}$ | +1.18 | 11 | 25 | 1.5 | 40.2 |
| $Al(citrate)_2(catecholate)^{2-/3-}$ | +1.25 | 11.5 | 26 | 0.5 | 13.4 |
| $Fe^{III/II}(H_2O)_6$ | +0.77 | 0 | n/a | 2 | 53.6 |
| $Ce^{IV/III}(H_2O)_x$ | +1.75 | 0 | n/a | 0.5 | 13.4 |

TABLE 2

Calculated OCVs and theoretical energy density (Wh/L) for selected electrolyte couple pairs calculated from data in Table 1.

| | $Fe(CN)_6^{3-/4-}$ | | $Al(cit)_2(cat)^{2-/3-}$ | |
|---|---|---|---|---|
| Couple | OCV (V) | Energy Density (Wh/L) | OCV (V) | Energy Density (Wh/L) |
| $Mn(CN)_6^{3-/4-}$ | 1.78 | 35.8 | 1.85 | 12.4 |
| $Fe(catecholate)_3^{2-/3-}$ | 1.68 | 33.8 | 1.75 | 11.7 |
| $Ti(catecholate)_3^{2-/3-}$ | 1.63 | 21.8 | 1.70 | 11.4 |
| $Ti(pyrogallate)_3^{2-/3-}$ | 1.73 | 34.8 | 1.80 | 12.1 |
| $Ti(catecholate)_2(pyrogallate)^{2-/3-}$ | 1.68 | 33.8 | 1.75 | 11.7 |
| $Ti(catecholate)_2(ascorbate)^{2-/3-}$ | 1.73 | 34.8 | 1.80 | 12.1 |
| $Ti(catecholate)_2(gluconate)^{2-/3-}$ | 1.78 | 35.8 | 1.85 | 12.4 |
| $Ti(catecholate)_2(lactate)^{2-/3-}$ | 1.67 | 33.6 | 1.74 | 11.7 |
| $Ti(catecholate)(pyrogallate)(lactate)^{2-/3-}$ | 1.73 | 34.8 | 1.80 | 12.1 |

Example 3—Method for Measuring the Hydrogen Evolution Current in a Flow Battery

The hydrogen evolution current in a flow battery may be determined by running a flow battery as described above in a manner that is substantially sealed (i.e., free of leaks) with the following additional analytical techniques. The negative electrolyte chamber is set up such that it provides a known headspace above the flowing electrolyte. This headspace is periodically sampled by a mass spectrometer, such as a Pfeiffer Vacuum Omnistar Gas Analysis System, that has been calibrated with an $H_2$ gas standard. The analysis system periodically samples the headspace of the negative electrolyte, and the hydrogen produced can be correlated with the current density applied in the battery, the headspace and electrolyte volumes, and the Henry's Constant for hydrogen in the system. For example, if 0.000187 moles (equivalent to 0.01 Ah of electrons) of $H_2$ are produced, and 1 Ah of current has been passed, then 1% of the current may be attributed to hydrogen evolution.

Example 4—Experimental Procedure and Results for Operation of a Flow Battery Comprising Aqueous Electrolyte with pH Between about 8 and about 13, a First and Second Redox Active Material, and a First Half-Cell Potential More Negative than −0.3V Vs. RHE Example 4.1—Method for Measuring a Flow Battery Open Circuit Potential (OCV)

Figure 27:
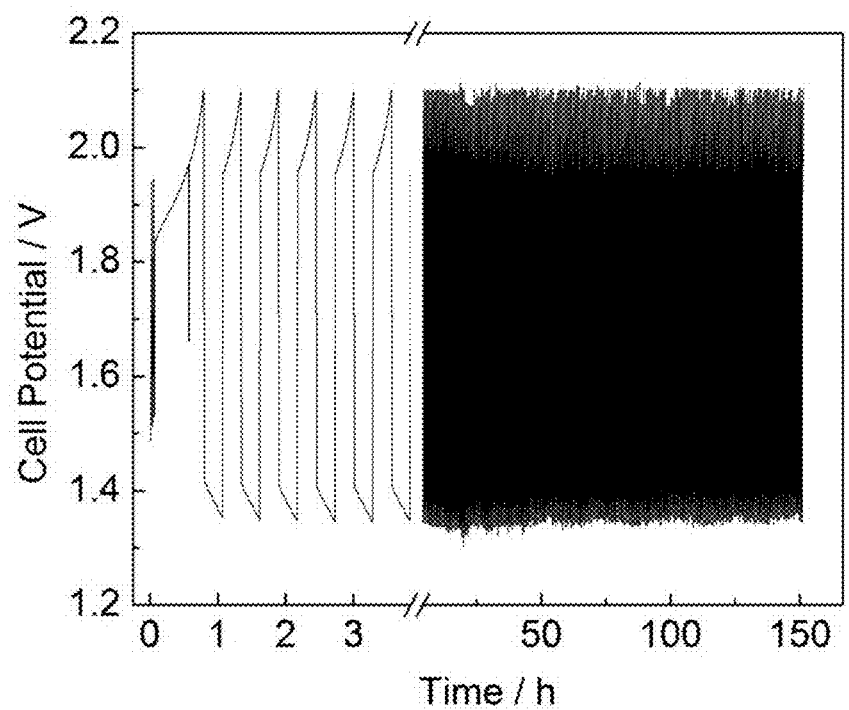
FIG. 27 provides stability performance data obtained during 250 charge/discharge cycles for a 5 cm$^2$ system based on Ti$^{4+/3+}$ (cat)$_3$$^{2-/3-}$ and Fe$^{3+/2+}$(CN)$_6$$^{3-/4-}$, as described in Example 4.1.

A redox flow battery cell was assembled according to the methods described in Example 1.2 using a first half-cell comprising titanium tris-catecholate ($Ti^{4+/3+}(cat)_3^{2-/3-}$) metal ligand coordination compound and a second half-cell comprising ferri/ferro-cyanide ($Fe^{3+/2+}(CN)_6^{3-/4-}$) metal ligand coordination compound as active materials for the negative and positive electrolytes, respectively with $E^+=1.18$ V vs. RHE and $E^-=-0.45$ V vs. RHE (OCV=1.63 V). The active materials were prepared at concentrations of 0.5 M in 0.5 M pH 11 $Na_2SO_4$ supporting electrolyte (negative electrolyte, or negolyte) or no supporting electrolyte (positive electrolyte, or posolyte) and were flowed at 100 mL/min through the flow battery cell assembled using 5 cm² carbon felt electrodes and a NAFION™ cation selective membrane (50 μm thick) in Na form. The cell was initially charged from 0 to 50% state of charge before several charge/discharge cycles was collected by charging and discharging the battery at a current density of ~150 mA/cm² and monitoring the resulting cell potential, FIG. 27. At open circuit, a cell potential of 1.63 V was observed as expected for equilibrium cell potential at 50% SOC. The half-cell potentials for the first and second half-cells were measured as −0.45 V vs. RHE and 1.18 V vs. RHE, respectively. Charge/discharge cycling revealed well-behaved, reproducible voltage/current vs. time traces. An RT voltage efficiency of 69% was measured for this system at 150 mA/cm². Typical resistances measured by the Hioki Battery Tester for the membrane and contact resistance component of cells built with NR212, XL, and HP membranes were 0.77, 0.60, and 0.5 ohm-cm², respectively.

Example 4.2

Figure 28:
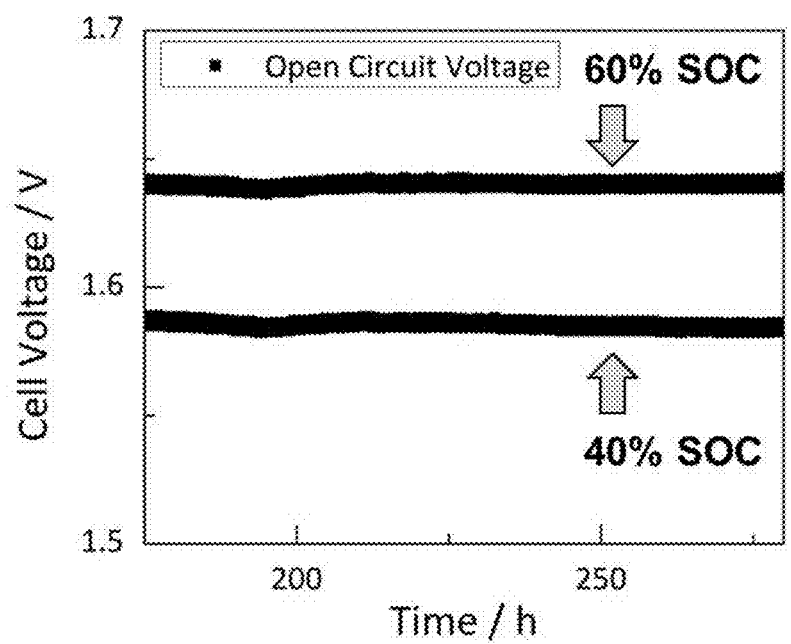
FIG. 28 provides current efficiency data obtained for a system based on Ti$^{4+/3+}$(cat)$_3$$^{2-/3-}$ and Fe$^{3+/2+}$(CN)$_6$$^{3-/4-}$, as described in Example 4.2.

A redox flow battery cell was assembled according to the methods described in Example 1.2 using titanium tris-catecholate ($Ti^{4+/3+}(cat)_3^{2-/3-}$) and ferri/ferro-cyanide ($Fe^{3+/2+}(CN)_6^{3-/4-}$) metal ligand coordination compounds as active materials for the negative and positive electrolytes, respectively. In a typical cell, stable voltages were observed upon repeatedly charging to 60% SOC and discharging to 40% SOC (see FIG. 28) when the discharge energy for each cycle was 99.8% of the charge energy, indicative of 99.8% roundtrip current efficiency. This was achieved by using a constant current density (e.g., 150 mA/cm$^2$) for both charge and discharge but with a discharge time that was slightly shorter than (i.e., 99.8% of) the charge time. Under these conditions, the open circuit voltages at 40 and 60% SOC were stable for extended periods of time.

Example 4.3

Figure 29:
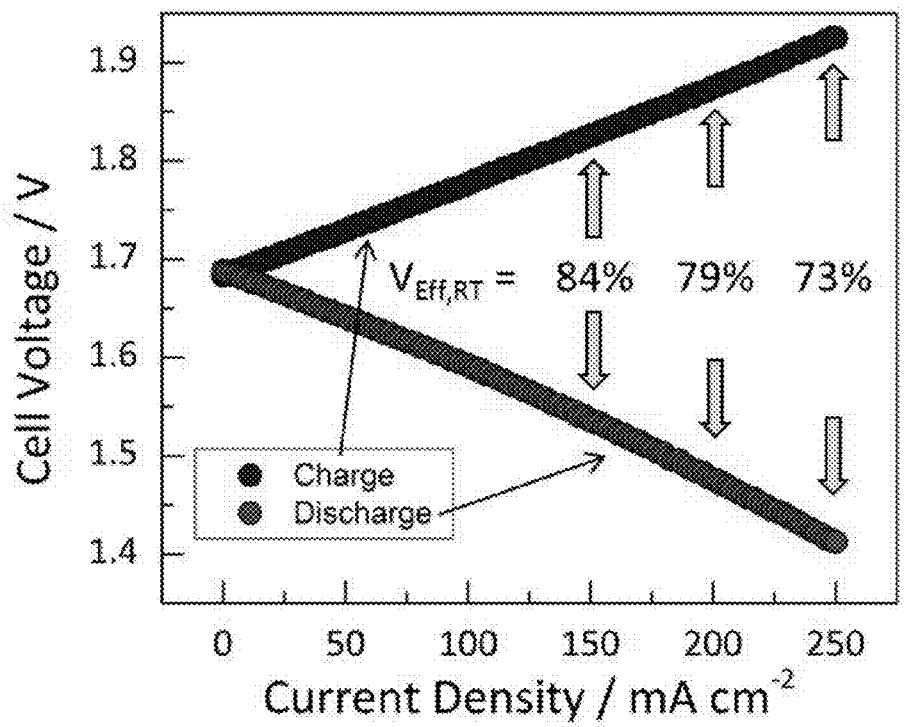
FIG. 29 provides voltage efficiency data, as a function of current density, for a system based on Ti$^{4+/3+}$(cat)$_2$(pyrogallate)$^{2-/3-}$ and Fe$^{3+/2+}$(CN)$_6$$^{3-/4-}$, as described in Example 4.3.

A redox flow battery cell was assembled according to the general methods described in Example 1.2, using titanium bis-catecholate mono-pyrogallate ($Ti^{4+/3+}(cat)_2(gal)^{2-/3-}$) and ferri/ferro-cyanide ($Fe^{3+/2+}(CN)_6^{3-/4-}$) metal ligand coordination compounds as active materials for the negative and positive electrolytes, respectively. In this example the carbon felt electrodes were replaced with TORAY™ carbon paper electrodes that were catalyzed with Vulcan carbon and NAFION™ in a manner similar to that of Example 2. Additionally, flow fields of the "interdigitated" type were employed. The active material solution concentrations were increased to 1.5 M and the cell performance was evaluated by monitoring the cell potential on both charge and discharge cycles as a function of current density. As can be seen in FIG. 29, the cell maintains round trip voltage efficiencies of 84%, 79%, and 73% at current densities of 150, 200, and 250 mA/cm$^2$, respectively. In this configuration the flow battery active materials exhibited an energy density of 32.79 Wh/L.

Figure 30:
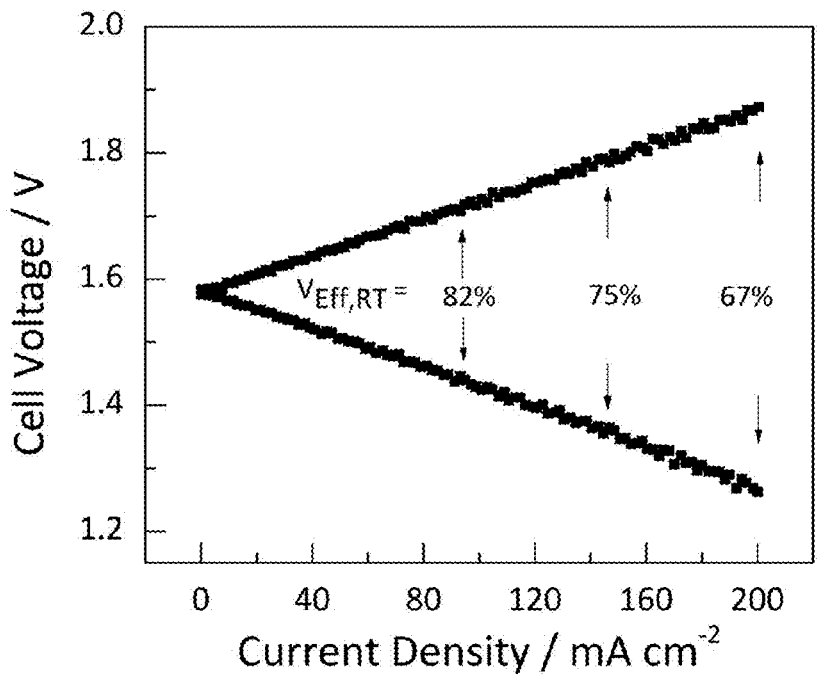
FIG. 30 provides voltage efficiency data, as a function of current density, for a system based on Ti$^{4+/3+}$(cat)$_3$$^{2-/3-}$ and Fe$^{3+/2+}$(CN)$_6$$^{3-/4-}$, as described in Example 4.3.
Figure 31:
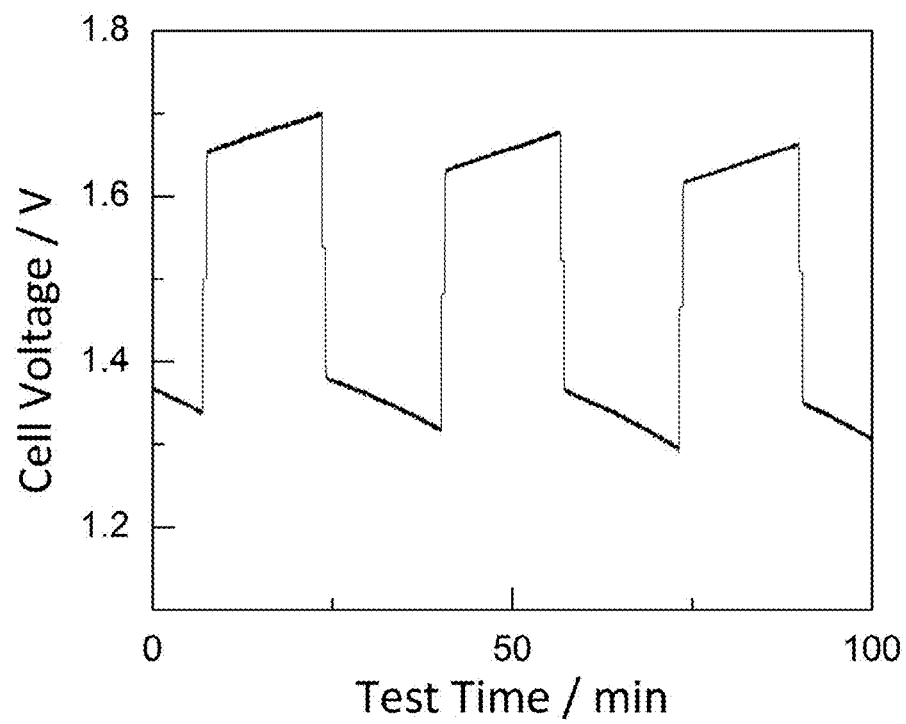
FIG. 31 provides a charge/discharge trace for a flow battery of the present invention. This example contains Fe$^{3+/2+}$(cat)$_3$$^{3-/4-}$ and Fe$^{3+/2+}$(CN)$_6$$^{3-/4-}$ as first and second electrolytes, respectively. The battery was charged from 0% SOC to 60% SOC and then discharged to 40% SOC at a current density of 100 mA/cm$^2$ and a RT voltage efficiency of ca. 82%.

The results of analogous experiments using $Ti^{4+/3+}(cat)_3^{2-/3-}$ and $Fe^{3+/2+}(CN)_6^{3-/4-}$ are shown in FIG. 30 and FIG. 31.

Example 4.4

Figure 32:
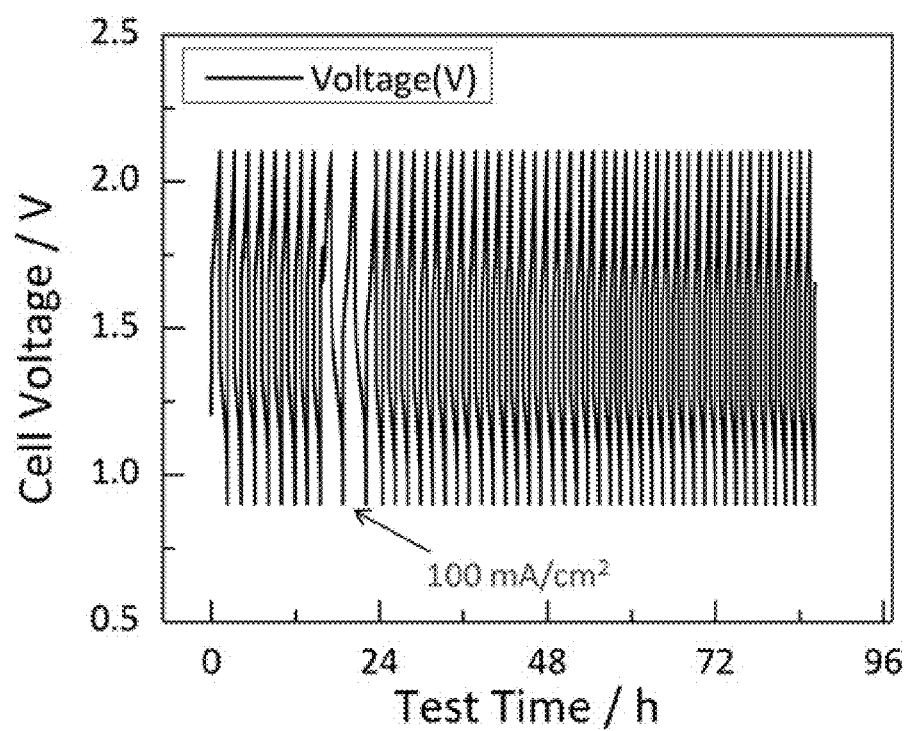
FIG. 32 provides data for cell voltage during charge-discharge cycling for 1 M Fe(CN)$_6$ as positive couple and 1 M Ti(lactate)$_2$(salicylate) as negative couple, both at pH 11, in a 5 cm$^2$ active area flow battery at a current density of 150 mA/cm$^2$ except for the area noted as 100 mA/cm$^2$.

A redox flow battery cell was assembled according to the methods described in Example 1.2 using titanium bis-lactate mono-salicylate ($[Ti^{4+/3+}(lactate)_2(salicylate)]^{2-/3-}$) and ferri/ferro-cyanide ($[Fe^{3+/2+}(CN)_6]^{3-/4-}$) metal ligand coordination compounds as active materials for the negative and positive electrolytes, respectively. The active material solutions were prepared at concentrations of 1 M with no additional supporting electrolyte and were flowed at 100 mL/min through the flow battery cell assembled using 5 cm$^2$ carbon paper electrodes and a NAFION™ cation selective membrane (25 μm thick) in the Na$^+$ form. The cell was initially charged from 0 to 25% state of charge before charge/discharge cycles were collected by charging and discharging the cell at 150 or 100 mA/cm$^2$ and monitoring the resulting cell potential, FIG. 32 (where visually wider cycles were taken at 100 instead of 150 mA/cm$^2$). At open circuit, a cell potential of 1.60 V was observed as expected for equilibrium cell potential at 50% SOC based on the externally measured $E_{1/2}$ values for $[Ti^{4+/3+}(lactate)_2(salicylate)]^{2-/3-}$ and $[Fe^{3+/2+}(CN)_6]^{3-/4-}$. Charge/discharge cycling revealed well behaved, reproducible voltage/current vs. time traces, demonstrating promising durability, FIG. 32. An RT voltage efficiency of 67% was measured for this system at 150 mA/cm$^2$.

Example 4.5

Figure 33:
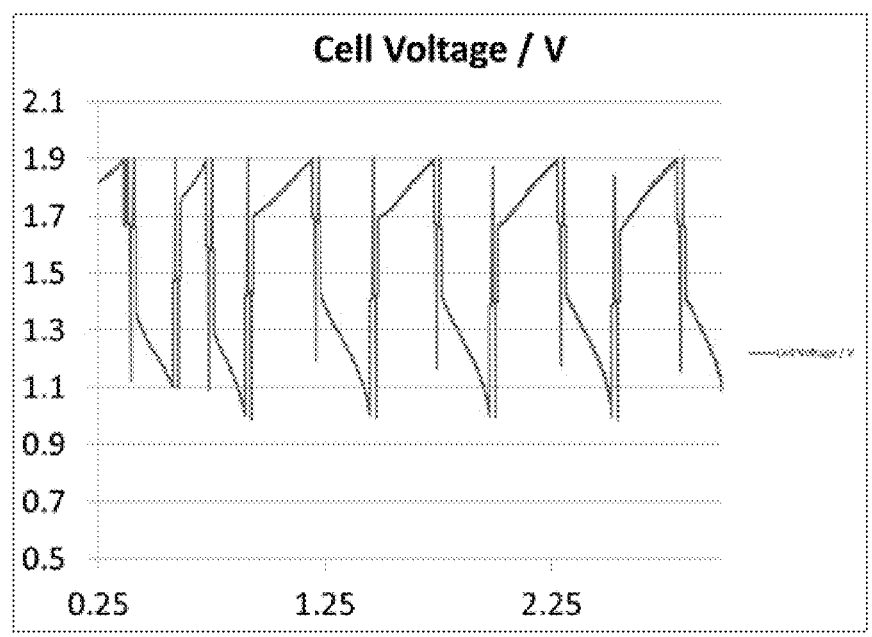
FIG. 33 provides cell voltage in volts plotted versus test time in hours during charge-discharge cycling and iV traces between each cycle for 1 M Fe(CN)$_6$ as positive couple and 1 M Ti(lactate)$_2$(α-hydroxyacetate) as negative couple, both at pH 11, in a 5 cm$^2$ active area flow battery at a current density of 150 mA/cm$^2$.

A redox flow battery cell was assembled according to the methods described in Example 1.2 using titanium bis-lactate mono-glycolic acid ($[Ti^{4+/3+}(lactate)_2\alpha\text{-hydroxyacetate})]^{2-/3-}$) and ferri/ferro-cyanide ($[Fe^{3+/2+}(CN)_6]^{3-/4-}$) metal ligand coordination compounds as active materials for the negative and positive electrolytes, respectively. In a typical cell, stable voltages were observed upon repeatedly charging to 75% SOC and discharging to 25% SOC (see FIG. 33) when the discharge energy for each cycle was 99.8% of the charge energy, indicative of 99.8% roundtrip current efficiency. This was achieved by using a constant current density (e.g., 150 mA/cm$^2$) for both charge and discharge but with a discharge time that was slightly shorter than (i.e., 99.8% of) the charge time. Under these conditions, the open circuit voltages at 25 and 75% SOC were stable for extended periods of time.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety.

What is claimed:

1. A flow battery comprising:
    a first aqueous electrolyte comprising a first redox active material;
    a second aqueous electrolyte comprising a second redox active material;
    a first electrode in contact with said first aqueous electrolyte in a first chamber containing said first aqueous electrolyte;
    a second electrode in contact with said second aqueous electrolyte in a second chamber containing said second aqueous electrolyte; and
    a separator disposed between said first aqueous electrolyte and said second aqueous electrolyte;
        wherein said first aqueous electrolyte and said second aqueous electrolyte are chosen such that said flow battery has an open circuit potential of at least 1.5 V, and said flow battery is capable of operating at a current density of at least 50 mA/cm$^2$;
        wherein said first redox active material remains soluble in said first aqueous electrolyte in both a charged state and a discharged state thereof, and said second redox active material remains soluble in said second aqueous electrolyte in both a charged state and a discharged state thereof; and
        wherein the flow battery contains only two electrolytes.

2. The flow battery of claim 1, wherein at least one of said first electrode and said second electrode is a carbon electrode.

3. The flow battery of claim 1 or claim 2, wherein said first and second electrodes remain metal-free during operation of said flow battery.

4. The flow battery of claim 1, wherein at least one of said redox active materials is an organic compound substantially devoid of metal.

5. The flow battery of claim 1, wherein at least one of said first and second redox active materials comprises an aromatic compound.

6. The flow battery of claim 1, wherein at least one of said first and second redox active materials is a metal ligand coordination compound.

7. The flow battery of claim 1 or claim 6, wherein said flow battery has an energy density of at least 30 watt hour/liter (Wh/L).

8. The flow battery of claim 1 or claim 6, wherein at least one of said first aqueous electrolyte and said second aqueous electrolyte has a pH in a range of from about 1 to about 13.

9. The flow battery of claim 1 or claim 6, wherein said first aqueous electrolyte, said second aqueous electrolyte, or both said first and second aqueous electrolytes has a pH in a range of from about 8 to about 13.

10. The flow battery of claim 9, wherein the pH is in a range of from about 10 to about 12.

11. The flow battery of claim 10, wherein the pH is in a range of from about 10.5 to about 11.5.

12. The flow battery of claim 1 or claim 6, wherein the flow battery is capable of operating with a voltage efficiency of at least about 70%.

13. The flow battery of claim 1 or claim 6, wherein said separator comprises an ionomer.

14. The flow battery of claim 1 or claim 6, further comprising:
a second electrolyte tank in fluidic communication with the second chamber and a first electrolyte tank in fluidic communication with the first chamber.

15. The flow battery of claim 14, further comprising:
a pump capable of transporting a fluid between the second electrolyte tank and the second chamber, between the first electrolyte tank and the first chamber, or both.

16. A system comprising a flow battery of claim 1 or claim 6, and further comprising:
at least one electrolyte circulation loop in fluidic communication with said first chamber and said second chamber, said at least one electrolyte circulation loop comprising storage tanks and piping for containing and transporting the first and second aqueous electrolytes;
control hardware and software; and
a power conditioning unit.

17. The system of claim 16, wherein the system is connected to an electrical grid configured to provide renewables integration, peak load shifting, grid firming, baseload power generation/consumption, energy arbitrage, transmission and distribution asset deferral, weak grid support, frequency regulation, or a combination thereof.

18. The system of claim 16, wherein the system is configured to provide stable power for remote camps, forward operating bases, off-grid telecommunications, or remote sensors.

19. A method of operating a flow battery of claim 1 or claim 6, said method comprising:
charging said flow battery by an input of electrical energy or discharging said flow battery by a removal of electrical energy.

20. A method of operating a flow battery of claim 1 or claim 6, said method comprising:
applying a potential difference across the first and second electrodes, with an associated flow of electrons, so as to:
reduce the first redox active material while oxidizing the second redox active material; or
oxidize the first redox active material while reducing the second redox active material.

21. A method of charging a flow battery of claim 1 or claim 6, with an associated flow of electrons, said method comprising:
applying a potential difference across the first and second electrodes, so as to:
reduce the first redox active material; or
oxidize the second redox active material; or
both reduce the first redox active material and oxidize the second redox active material.

22. A method of discharging the flow battery of claim 1 or claim 6, with an associated flow of electrons, said method comprising:
applying a electrical load across the first and second electrodes, so as to:
oxidize the first redox active material; or
reduce the second redox active material; or
both oxidize the first redox active material and reduce the second redox active material.

* * * * *